US009047219B2

(12) United States Patent
Daikokuya et al.

(10) Patent No.: US 9,047,219 B2
(45) Date of Patent: Jun. 2, 2015

(54) STORAGE SYSTEM, STORAGE CONTROL DEVICE, AND STORAGE CONTROL METHOD

(75) Inventors: Hidejirou Daikokuya, Kawasaki (JP); Kazuhiko Ikeuchi, Kawasaki (JP); Takeshi Watanabe, Kawasaki (JP); Norihide Kubota, Kawasaki (JP); Atsushi Igashira, Yokohama (JP); Kenji Kobayashi, Kawasaki (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 13/570,398

(22) Filed: Aug. 9, 2012

(65) Prior Publication Data

US 2013/0047028 A1    Feb. 21, 2013

(30) Foreign Application Priority Data

Aug. 17, 2011  (JP) ................. 2011-178280

(51) Int. Cl.
*G06F 11/00* (2006.01)
*G06F 11/10* (2006.01)
*G06F 11/07* (2006.01)
*G06F 11/20* (2006.01)

(52) U.S. Cl.
CPC ........ *G06F 11/1092* (2013.01); *G06F 11/2094* (2013.01); *G06F 11/0727* (2013.01); *G06F 11/076* (2013.01); *G06F 11/0772* (2013.01)

(58) Field of Classification Search
CPC ............ G06F 11/1469; G06F 11/1456; G06F 11/2071; G06F 11/2097
USPC ........................................................ 714/6.3
See application file for complete search history.

(56) References Cited

U.S. PATENT DOCUMENTS

| | | | |
|---|---|---|---|
| 6,516,425 B1 * | 2/2003 | Belhadj et al. ............... | 714/6.12 |
| 7,383,380 B2 | 6/2008 | Yagisawa et al. | |
| 2003/0084372 A1 * | 5/2003 | Mock et al. .................... | 714/15 |
| 2007/0226533 A1 * | 9/2007 | Hafner et al. ................. | 714/6 |
| 2008/0126837 A1 * | 5/2008 | Chen ............................. | 714/5 |
| 2009/0135698 A1 * | 5/2009 | Fujibayashi et al. ........ | 369/53.42 |
| 2012/0311403 A1 * | 12/2012 | Gladwin et al. ............... | 714/763 |

FOREIGN PATENT DOCUMENTS

| | | |
|---|---|---|
| JP | 05-314674 | 11/1993 |
| JP | 7-200191 A | 8/1995 |
| JP | 2004-252692 A | 9/2004 |

(Continued)

OTHER PUBLICATIONS

Japanese Office Action mailed Feb. 24, 2015 for corresponding Japanese Patent Application No. 2011-178280, with Partial English Translation, 6 pages.

*Primary Examiner* — Yair Leibovich
(74) *Attorney, Agent, or Firm* — Fujitsu Patent Center

(57) ABSTRACT

A control device manages a plurality of storage devices so that data to be recorded is redundantly recorded in different storage devices. An error monitoring unit monitors an occurrence of an error in each of the plurality of storage devices to register information indicative of error occurrence conditions in an error information storage unit for each storage device. When the use of one of the plurality of storage devices is stopped, a rebuild controller determines a timing to perform rebuild processing based on past error occurrence conditions in the storage devices other than the one storage device of the plurality of storage devices by referring to information registered in the error information storage unit.

19 Claims, 15 Drawing Sheets

(56) References Cited

FOREIGN PATENT DOCUMENTS

| JP | 2005-99995 A | 4/2005 |
| JP | 2005-100259 | 4/2005 |
| JP | 2005-284449 | 10/2005 |
| JP | 2006-79219 A | 3/2006 |
| JP | 2006-260236 A | 9/2006 |
| JP | 2006-285803 A | 10/2006 |
| JP | 2010-128773 | 6/2010 |
| JP | 2011-28430 A | 2/2011 |

* cited by examiner

FIG. 7

250 ERROR SCORE TABLE

| DISK NUMBER | ERROR SCORE |
|---|---|
| DISK#0000 ← 251 | 000 |
| DISK#0001 ← 251 | 020 |
| ⋮ | ⋮ |

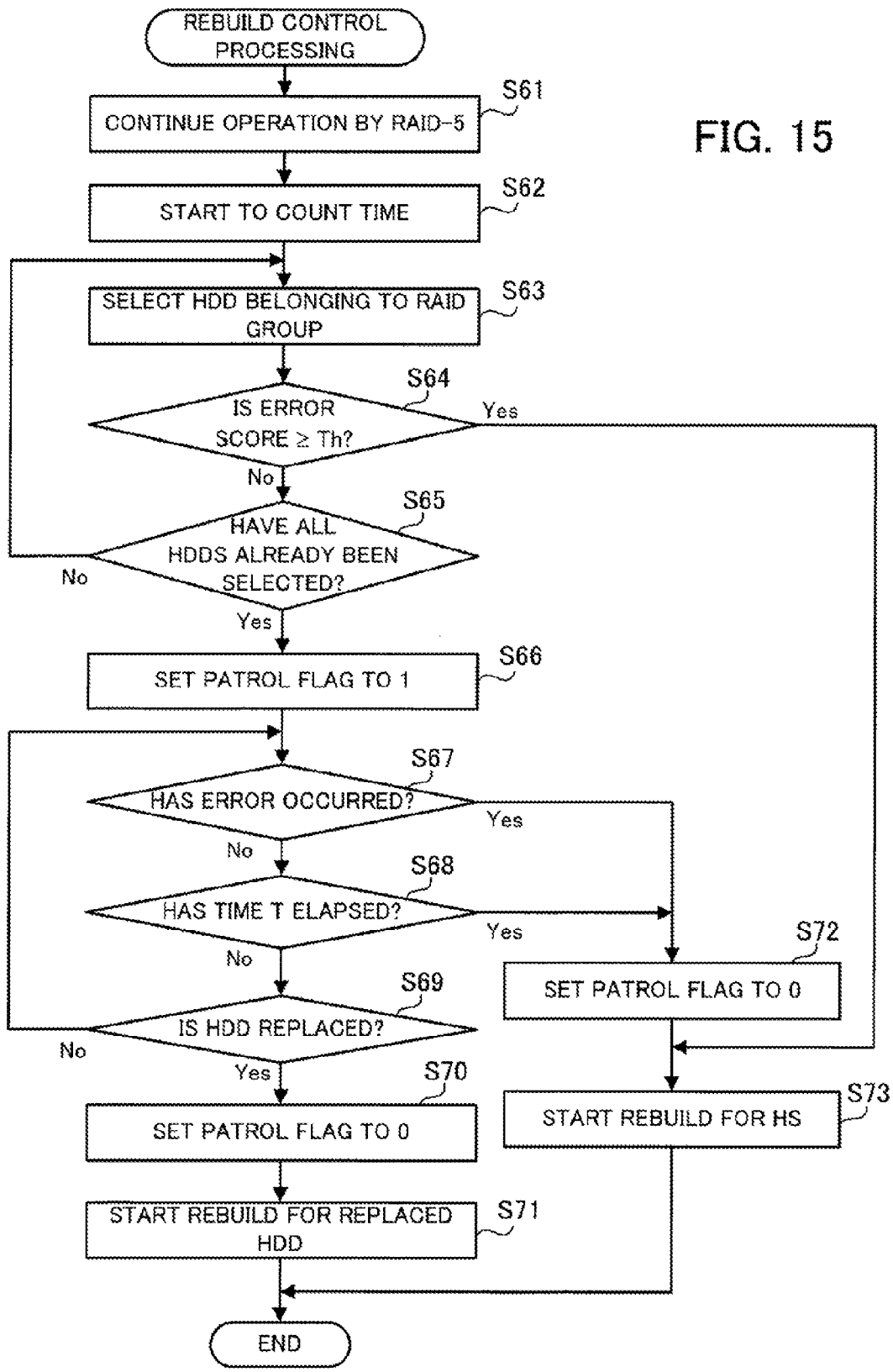

STORAGE SYSTEM, STORAGE CONTROL DEVICE, AND STORAGE CONTROL METHOD

CROSS-REFERENCE TO RELATED APPLICATION

This application is based upon and claims the benefit of priority of the prior Japanese Patent Application No. 2011-178280, filed on Aug. 17, 2011, the entire contents of which are incorporated herein by reference.

FIELD

The embodiments discussed herein relate to a storage system, a storage control device, and a storage control method.

BACKGROUND

In recent years, a storage system using a plurality of storage devices, such as an HDD (Hard Disk Drive), is widely used. In such a storage system, in general, the safety of data to be recorded is improved by performing recording control so that data is redundantly recorded in two or more storage devices using the RAID (Redundant Arrays of Inexpensive Disks) technique.

Further, in a storage system in which data is made redundant, if the use of one storage device is stopped due to a failure etc., the data stored in the storage device the use of which is stopped is rebuilt and stored in another storage device. Such processing is called "rebuild processing" generally. In many storage systems, a spare storage device called a hot spare is provided and the rebuild processing is performed using the hot spare in many cases. When a storage device fails, by performing the rebuild processing immediately using a hot spare as a data storage destination, it is possible to return a state to the state where data is made redundant in a brief time and to recover the safety of data in a brief time.

As a technique to recover the safety of data using a spare storage device, for example, there is a method in which a storage device having a high possibility of the occurrence of a failure is estimated based on the number of times of occurrence of an error and the data of the storage device is copied in advance in the spare storage device.

Further, as an example of control when a failure has occurred in a storage device, there is a system that performs control so that failure recovery processing is performed preferentially over the normal read and write processing when there is no margin in the degree of redundancy when a failure has occurred in a storage device. For example, the following literature describes such conventional methods and systems.

Japanese Laid-open Patent Publication No. 2010-128773
Japanese Laid-open Patent Publication No. 2005-100259
Japanese Laid-open Patent Publication No. 05-314674

In the rebuild processing, data is read from at least one of the remaining storage devices the use of which is continued and the data is written to another storage device. Because of this, while the rebuild processing is being performed, the burden of access processing in the remaining storage devices the use of which is continued and the burden of processing of a control device configured to control access to the storage device become heavy, and therefore, there is a possibility that the speed of data access in response to a request from a host device is reduced.

As described above, when the use of a storage device is stopped in the state where data is made redundant, it is possible to recover the redundancy of the data in a brief time by performing the rebuild processing as soon as possible. However, if the rebuild processing is performed in a brief time after the use of a storage device is stopped, there is a possibility that the speed of data access in response to a request from a host device is reduced during a predetermined period after the use of a storage device is stopped.

SUMMARY

In one aspect of the embodiments, a storage system includes a plurality of storage devices, and a control device configured to control data recording in the plurality of storage devices so that data to be recorded in the plurality of storage devices is redundantly recorded in different storage devices, wherein the control device includes one or a plurality of processors configured to perform a procedure including: registering error information indicative of error occurrence conditions in a memory for each storage device by monitoring an occurrence of an error in each of the plurality of storage devices; and determining, when the use of a first storage device of the plurality of storage devices is stopped, a timing to perform rebuild processing to generate data stored in the first storage device and to store the data in another storage device based on past error occurrence conditions in the storage devices other than the first storage device of the plurality of storage devices by referring to the error information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of information to be registered in an error score table;

FIG. 15 is a flowchart illustrating a procedure example of rebuild control processing by the rebuild controller.

DESCRIPTION OF EMBODIMENTS

Figure 1:
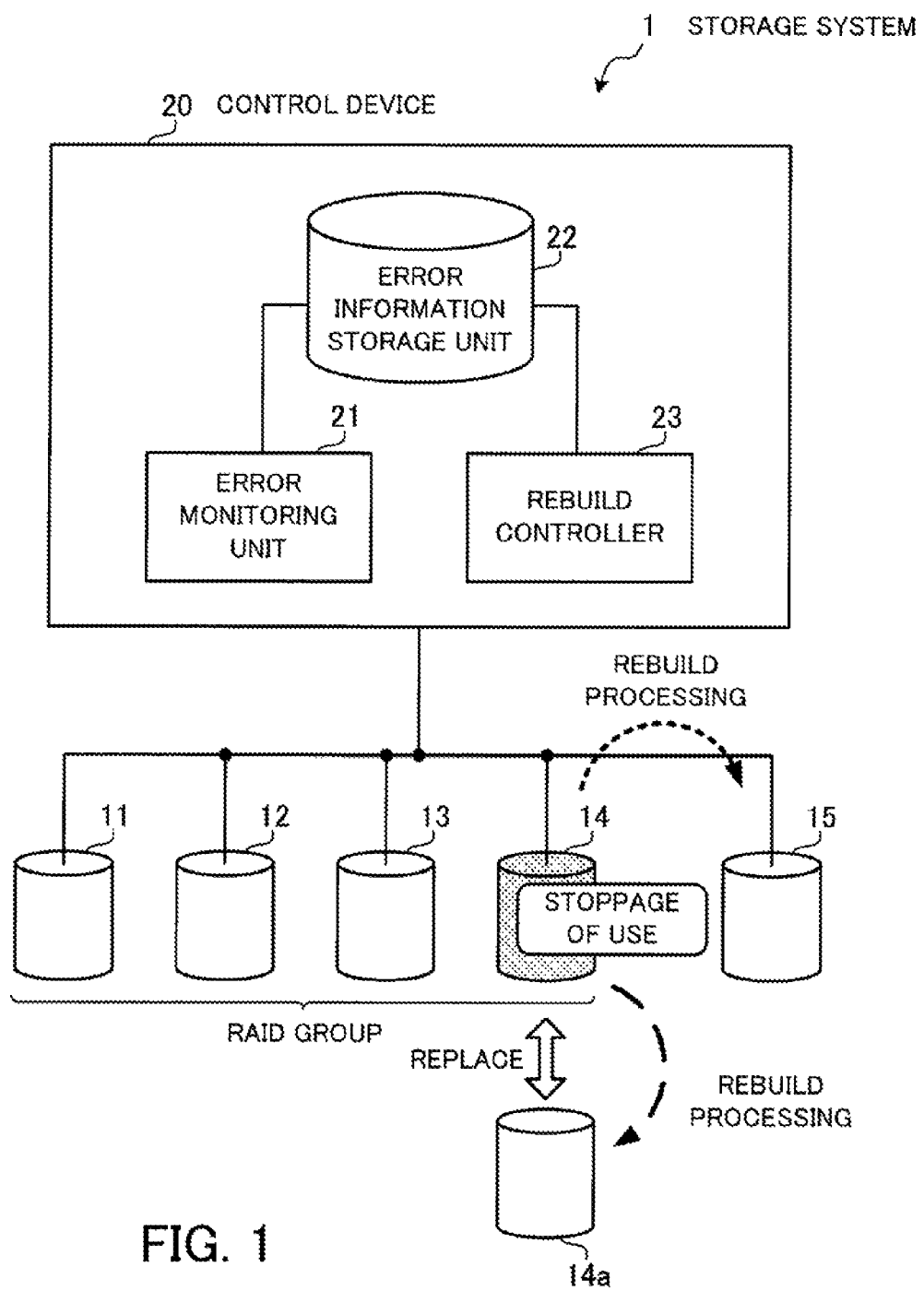
FIG. 1 illustrates a configuration example of a storage system according to a first embodiment.

Several embodiments will be described below with reference to the accompanying drawings, wherein like reference numerals refer to like elements throughout.

First Embodiment

FIG. 1 illustrates a configuration example of a storage system according to a first embodiment.

A storage system 1 illustrated in FIG. 1 includes a plurality of storage devices 11 to 15 and a control device 20. Each of the storage devices 11 to 15 is a nonvolatile storage device, such as an HDD and SSD (Solid State Drive). The number of storage devices the storage system 1 includes may be any number not less than two.

The control device 20 controls access from a host device, not illustrated, to data recorded in the storage device included in the storage system 1. Further, the control device 20 manages data to be recorded in a predetermined number, not less than two, of storage devices included in the storage system 1 so that the data is redundantly recorded in a plurality of storage devices using the predetermined number of storage devices.

Here, a unit of the storage devices in which data is managed so as to be redundantly recorded in a plurality of storage devices is called a "RAID group". In the example of FIG. 1, it is assumed that the four storage devices 11 to 14 belong to one RAID group. For example, the control unit 20 manages data in the storage devices 11 to 14 so that the data is redundantly recorded in the two storage devices using any of RAIDs-1, 4 and 5. Alternatively, the control device 20 may manage data in the storage devices 11 to 14 so that the data is redundantly recorded in the three storage devices using RAID-6.

The control device 20 includes an error monitoring unit 21, an error information storage unit 22, and a rebuild controller 23. Processing of the error monitoring unit 21 and the rebuild controller 23 is realized when an unillustrated CPU (Central Processing Unit) included in the control device 20 executes predetermined programs. The error information storage unit 22 is realized by various kinds of nonvolatile storage devices, such as an SSD. Note that, the error information storage unit 22 may be provided outside the control device 20.

The error monitoring unit 21 monitors an occurrence of an error at least in the storage devices 11 to 14 belonging to the RAID group and registers information indicative of error occurrence conditions in the error information storage unit 22 for each storage device. Information indicative of error occurrence conditions includes, for example, an error occurrence history for each storage device, an error score for each storage device, which is incremented in accordance with error occurrence conditions.

Further, the error monitoring unit 21 inspects whether or not an error has occurred by, for example, periodically accessing the storage devices 11 to 14. In addition, the error monitoring unit 21 may register the occurrence of an error in the error information storage unit 22 if the error is detected, for example, when the control device 20 accesses the storage devices 11 to 14 in response to an access request from the host device.

The rebuild controller 23 performs "rebuild processing" to, when the use of any of the storage devices 11 to 14 belonging to the RAID group is stopped, generate the data stored in the storage device the use of which is stopped and to store the data in another storage device.

Here, the use of the storage device is stopped, for example, when the storage device is no longer accessible due to a failure, when the number of times of occurrence of an error detected by the error monitoring unit 21 in the storage device reaches a predetermined number, when the storage device is detached for the purpose of replacement, etc.

Hereinafter, as an example, explanation is given on the assumption that the use of the storage device 14 is stopped as illustrated in FIG. 1.

In the rebuild processing, the rebuild controller generates the data stored in the storage device 14 based on the data stored in at least one of the storage devices other than the storage device 14 the use of which is stopped of the storage devices 11 to 14 belonging to the RAID group. For example, if it is assumed that the write control by RAID-5 is performed using the storage devices 11 to 14, the rebuild controller 23 restores the data stored in the storage device 14 by calculation based on the data stored in the storage devices 11 to 13. Further, when mirroring of data is performed using the storage devices 11 to 14, the rebuild controller 23 reads mirror data corresponding to the data stored in the storage device 14 from any of the storage devices 11 to 13.

It is possible to arbitrarily determine a data storage destination in the rebuild processing. For example, if it is assumed that the storage device 15 is a spare storage device provided in advance in the storage system 1, it is possible to use the storage device 15 as a data storage destination in the rebuild processing as indicated by a dotted line arrow in FIG. 1.

When the use of the storage device 14 is stopped, the rebuild controller 23 determines past error occurrence conditions in the storage devices 11 to 13 based on the information about the storage devices 11 to 13 registered in the error information storage unit 22 and controls the timing to perform the rebuild processing based on the determination result. In a case of determining that the past operating conditions of at least one of the storage devices 11 to 13 are not favorable based on the past error occurrence conditions, the rebuild controller 23 performs the rebuild processing at an earlier timing than in the other cases.

For example, when the error monitoring unit 21 registers an error score in the error information storage unit 22 as described above, the rebuild controller 23 determines that the past operating conditions of the storage device are favorable when the error score is less than a predetermined threshold value because the number of times of occurrence of an error in the past of the storage device corresponding to the error score is small. On the other hand, when the error score is equal to or greater than the predetermined threshold value, the rebuild controller 23 determines that the past operating conditions of the storage device corresponding to the error score are not favorable. The rebuild controller 23 may determine that the past operating conditions are favorable when no error has occurred in the storage device in the past or may determine that the past operating conditions are not favorable when an error has occurred at least once in the past.

Here, in the storage devices 11 to 14 belonging to the RAID group, data is made redundant, and therefore, even when the use of the one storage device 14 is stopped, it is possible to continue data access processing based on a request from the host device using the remaining storage devices 11 to 13. On the other hand, in the rebuild processing, read from at least one of the storage devices 11 to 13 the use of which is continued and write of data to another storage device, such as the storage device 15, are performed. Because of this, during the rebuild processing, the burden of access processing in the storage devices 11 to 13 and of access control processing by the control device 20 becomes heavy and there is a possibility that the speed of data access in response to a request from the host device is reduced.

When the use of the storage device 14 is stopped, by performing the rebuild processing as soon as possible, it is possible to return the degree of data redundancy to the state before the use is stopped in a brief time, and therefore, to maintain the safety of data. On the contrary, by performing the rebuild processing, there is a possibility that the speed of data access in response to a request from the host device is reduced.

In contrast to this, if it is possible to delay the timing to perform the rebuild processing after the use of the storage device 14 is stopped, it is made possible to perform the rebuild processing during an arbitrary time zone during which access to the storage device is less frequent, such as during the non-operating time. On the other hand, as the timing to perform the rebuild processing is delayed, the period during which the safety of data is reduced is prolonged.

The rebuild controller 23 estimates that the possibility that a failure occurs in any of the storage devices 11 to 13 in the future is high when the use of the storage device 14 is stopped and the past operating conditions of at least one of the storage devices 11 to 13 are not favorable. In this case, the rebuild controller 23 determines that the rebuild processing should be performed as soon as possible in order to maintain the safety of data and performs the rebuild processing at an earlier timing compared to the case where the past operating conditions are favorable.

On the other hand, the rebuild controller 23 estimates that the possibility that a failure occurs in any of the storage devices 11 to 13 in the future is small when the use of the storage device 14 is stopped and the past operating conditions of all the storage devices 11 to 13 are favorable. In this case, the rebuild controller 23 determines that the safety of data is maintained without performing the rebuild processing during a certain period and performs the rebuild processing at a delayed timing compared to the case where the past operating conditions are not favorable. Due to this, it is possible to reduce the burden of access processing in the storage devices 11 to 13 and the burden of processing of the control device 20 during a certain period after the use of the storage device 14 is stopped while maintaining the safety of data as much as possible.

According to the processing of the rebuild controller 23 described above, by referring to the past error occurrence conditions in the storage devices 11 to other than the failed storage device 14, it is made possible to determine the timing to perform the rebuild processing while maintaining the safety of data stored in the storage devices 11 to 14 as much as possible.

For example, when the use of the storage device 14 is stopped, the rebuild controller 23 may change not only the timing to perform the rebuild processing but also the data storage destination in the rebuild processing in accordance with the past error occurrence conditions in the storage devices 11 to 13. For example, the rebuild controller 23 stores the data stored in the storage device 14 in the spare storage device 15 provided in advance in the storage system 1 when the past operating conditions of at least one of the storage devices 11 to 13 are not favorable. On the other hand, when the past operating conditions of all the storage devices 11 to 13 are favorable, the rebuild controller 23, after detecting that the storage device 14 is replaced with a new storage device 14a, stores the data stored in the storage device in the replaced storage device 14a (corresponding to the broken line arrow in FIG. 1).

According to the latter processing, the new storage device 14a is mounted at the position at which the storage device 14 has been mounted, and therefore it is possible for the control device 20 to continue access control in the RAID group by returning the configuration of the RAID group to the state before the use of the storage device 14 is stopped. Consequently, it is possible to facilitate the management of the RAID group by the control device 20 while maintaining the safety of data as much as possible.

Further, when the storage device 15 is a so-called hot spare, the rebuild controller 23, after storing the data in the storage device 15 in the rebuild processing, when the storage device 14 is replaced with the new storage device 14a, performs "copy back processing" to write back the data stored in the storage device 15 to the new storage device 14a. In this case, when the use of the storage device 14 is stopped and the past operating conditions of all the storage devices 11 to 13 are favorable as described above, the rebuild controller 23 need not perform the copy back processing by changing the data storage destination in the rebuild processing to the replaced storage device 14a. Due to this, it is possible to further reduce the burden of access processing in the storage devices 11 to 13 and 14a and the burden of processing by the control device 20.

Second Embodiment

Next, as a second embodiment, an example of a storage system is explained, which includes a hot spare storage device and at the same time, in which storage devices are managed using RAID-6.

Figure 2:
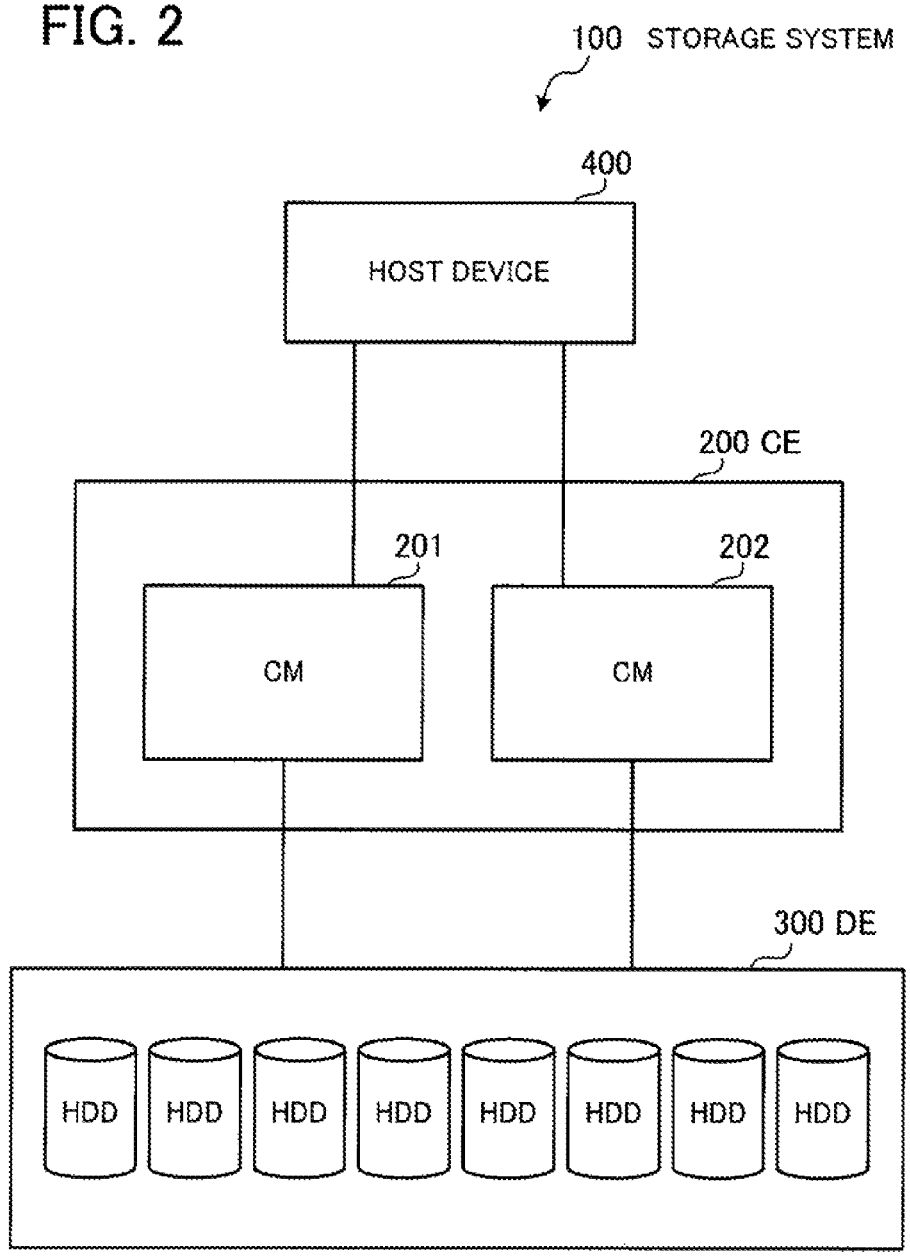
FIG. 2 illustrates a general configuration example of a storage system according to a second embodiment.

FIG. 2 illustrates a general configuration example of a storage system according to the second embodiment. A storage system 100 illustrated in FIG. 2 includes a controller enclosure (CE) 200, a drive enclosure (DE) 300, and a host device 400.

The controller enclosure 200 includes controller modules (CM) 201 and 202. Each of the controller modules 201 and 202 reads and writes data from and to storage devices within the drive enclosure 300 in response to a request from the host device 400. The controller modules 201 and 202 manage physical storage regions implemented by the storage devices within the drive enclosure 300 by RAID and control access to the physical storage regions.

It may also be possible to provide only one or three or more controller modules within the controller enclosure 200. However, when the controller modules are provided in plurality, the access control system to the drive enclosure 300 is made redundant and reliability of the access control processing is improved.

The drive enclosure 300 includes a plurality of storage devices the access to which from the controller modules 201 and 202 is to be controlled. In the present embodiment, the drive enclosure 300 is a disk array device including HDDs as storage devices. As a storage device included in the drive enclosure 300, it may also be possible to use another kind of nonvolatile storage device, such as an SSD. Further, to the controller enclosure 200, a plurality of the drive enclosures 300 may be connected.

The host device 400, in response to a user's operation, requests the controller modules 201 and 202 for access to the HDD within the drive enclosure 300. The host device 400 may read data from the HDD within the drive enclosure 300 or write data to the HDD within the drive enclosure 300 through one of the controller modules 201 and 202, for example, in response to a user's operation.

Both the controller modules 201 and 202 within the controller enclosure 200 have the same configuration and are capable of performing the same processing. Therefore, in the following, only the controller module 201 is explained and explanation of the controller module 202 is omitted.

Figure 3:
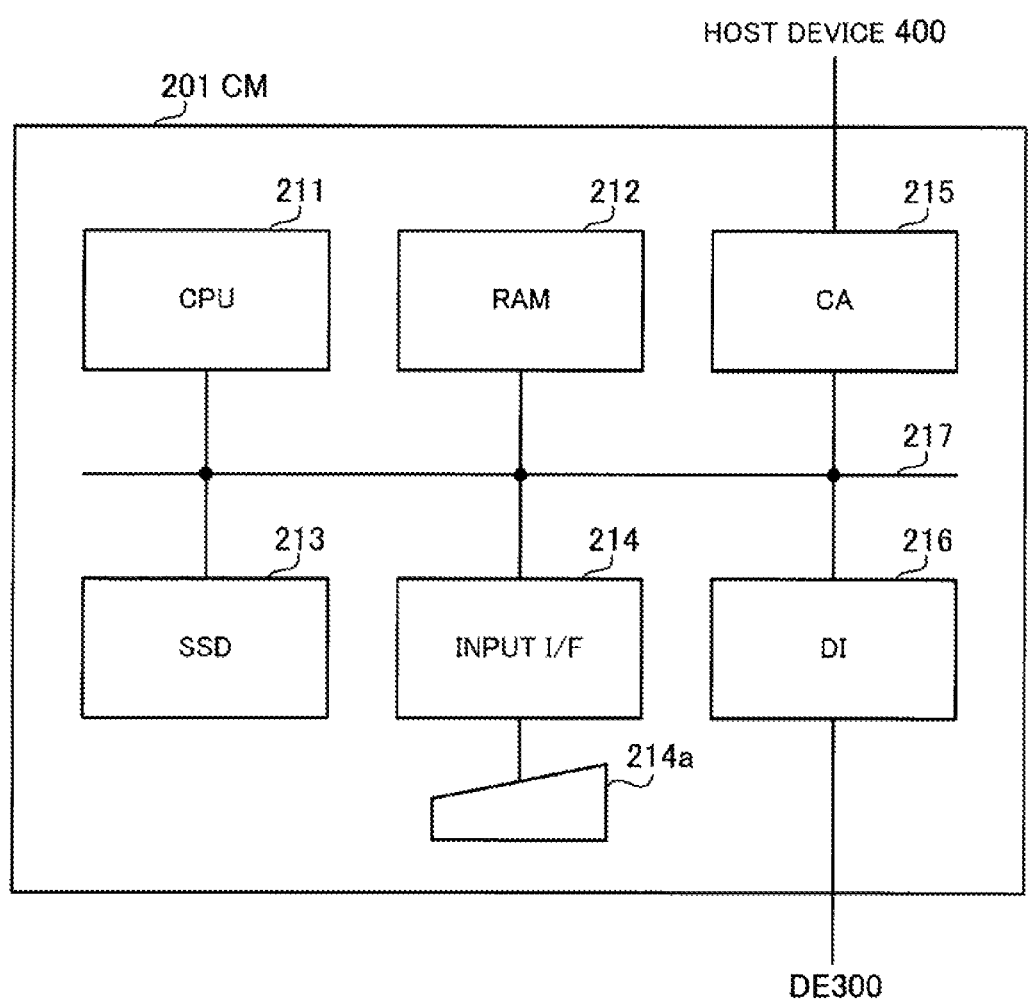
FIG. 3 illustrates a hardware configuration example of a CM.

FIG. 3 illustrates a hardware configuration example of a controller module.

The whole of the controller module 201 is controlled by a CPU 211. To the CPU 211, a RAM (Random Access Memory) 212 and a plurality of peripherals are connected via a bus 217. The RAM 212 is used as a main storage device of the controller module 201 and temporarily stores at least part of programs that the CPU 211 is caused to execute and various kinds of pieces of data necessary for the processing by the programs.

To the CPU 211, as examples of peripherals, an SSD 213, an input I/F (interface) 214, a channel adapter (CA) 215, and a drive interface (DI) 216 are connected.

The SSD 213 is used as a secondary storage device of the controller module 201 and stores programs to be executed by the CPU 211 and various kinds of pieces of data necessary to execute the programs. As a secondary storage device, another kind of nonvolatile storage device, such as an HDD, may be used.

To the input I/F 214, an input device 214a including an operation key etc. is connected. The input I/F 214 outputs, to the CPU 211, a signal in response to an operation input to the input device 214a.

The channel adapter 215 performs interface processing to transmit and receive data between the host device 400 and the controller module 201. The channel adapter 215 and the host device 400 establish communication in accordance with, for example, the Fibre Channel (FC) standards.

The drive interface 216 performs interface processing to transmit and receive data between the drive enclosure 300 and the controller module 201. The drive interface 216 and the drive enclosure 300 establish communication in accordance with, for example, the SAS (Serial Attached SCSI (Small Computer System Interface)) standards.

Figure 4:
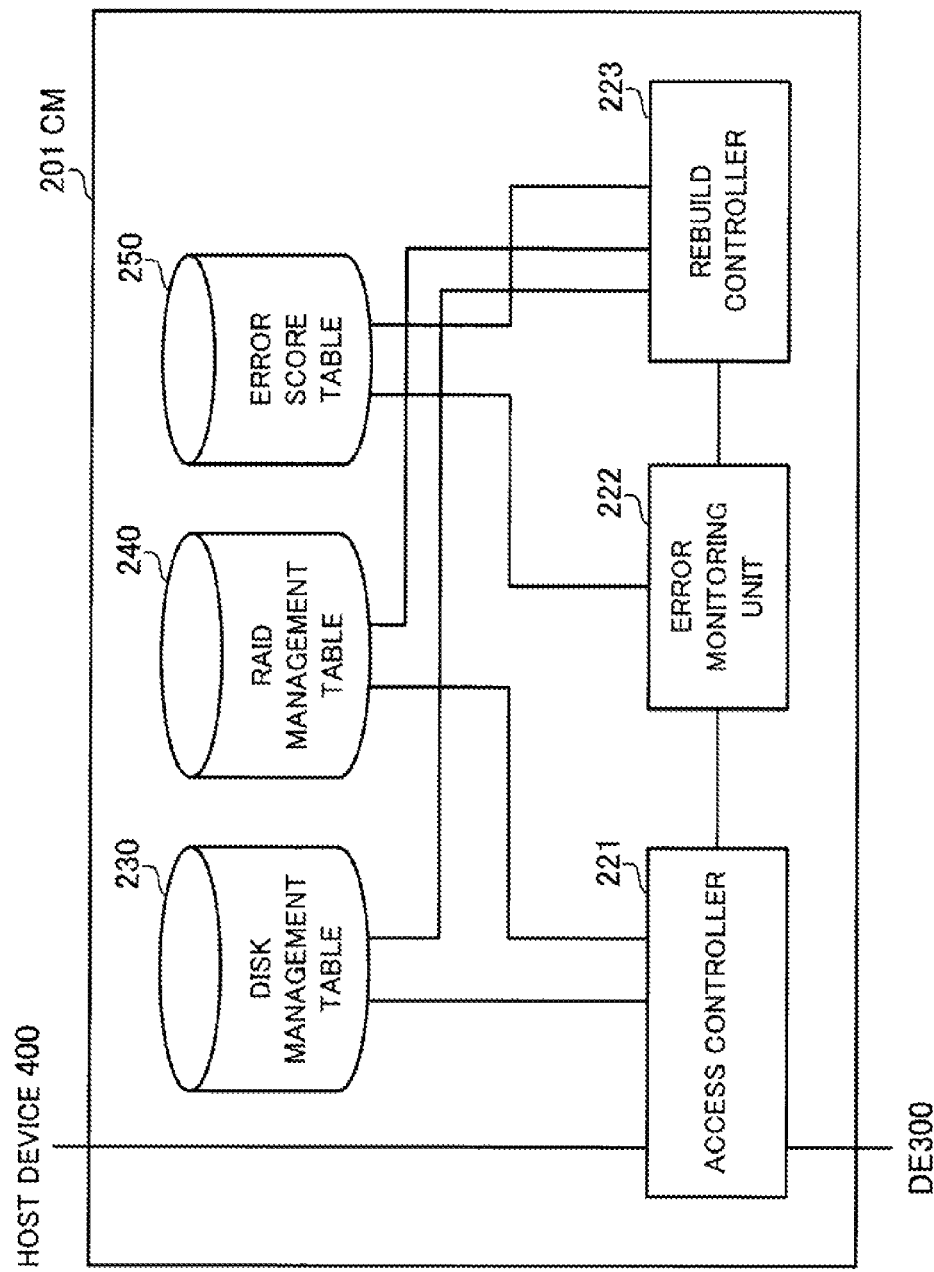
FIG. 4 is a block diagram illustrating a configuration example of processing functions of a CM.

FIG. 4 is a block diagram illustrating a configuration example of processing functions of a controller module.

The controller module 201 includes an access controller 221, an error monitoring unit 222, and a rebuild controller 223. The processing of each processing block is implemented by, for example, the CPU 211 of the controller module 201 executing predetermined programs. Further, in the storage device of the controller module 201, a disk management table 230, a RAID management table 240, and an error score table 250 are stored. The disk management table 230, the RAID management table 240, and the error score table 250 are stored, for example, in the SSD 213.

The access controller 221 accesses the HDD within the drive enclosure 300 in response to a request from the host device 400. For example, the access controller 221, when requested to read the data by the host device 400, reads the requested data from a predetermined HDD within the drive enclosure 300 and transmits the data to the host device 400. On the other hand, the access controller 221, when requested to write data by the host device 400, writes the data to be written that is received from the host device 400 to a predetermined HDD within the drive enclosure 300.

Further, the access controller 221 manages the data recorded in the HDD within the drive enclosure 300 by RAID based on information set in the disk management table 230 and the RAID management table 240. In the present embodiment, it is made possible for the access controller 221 to perform control of data recording using at least RAIDs-5 and 6.

The disk management table 230 retains an identification number of the HDD and information indicative of the state of the HDD for each HDD provided in the drive enclosure 300. The RAID management table 240 retains an identification number of the RAID group, the RAID level to be applied, information indicative of the HDD belonging to the RAID group, information indicative of the control state of the RAID group, etc., for each RAID group managed using a predetermined RAID level, respectively.

The access controller 221 determines, for example, the HDD, which is the recording destination when data is recorded, the RAID level used at the time of the recording, etc., by referring to the RAID management table 240. Further, it is possible for the access controller 221 to recognize the state of the HDD by referring to the record of the disk management table 230 corresponding to the HDD registered in the RAID management table 240.

Furthermore, when detecting an error based on the response from the HDD of access destination when accessing the HDD within the drive enclosure 300 in response to a request from the host device 400, the access controller 221 notifies the error monitoring unit 222 of that an error is detected along with information for identifying the HDD in which the error is detected. There is also a case where the access controller 221 accesses the HDD within the drive enclosure 300 in response to a request from the error monitoring unit 222 or the rebuild controller 223.

The error monitoring unit 222 performs "patrol processing" to periodically monitor the error occurrence conditions of the HDD within the drive enclosure 300. In the patrol processing, the error monitoring unit 222 causes the access controller 221 to periodically transmit a predetermined command to each of the HDDs within the drive enclosure 300 and determines the presence or absence of the occurrence of an error from the response to the command. The error monitoring unit 222 refers to a patrol flag, to be described later, registered in the RAID management table 240 and when the patrol flag is "1", enhances the patrol by reducing the intervals shorter between inspections of the error occurrence conditions than when the patrol flag is "0".

The error monitoring unit 222 registers the error occurrence conditions for each HDD in the error score table 250. In the error score table 250, an error score is registered for each HDD identification number. When detecting the occurrence of an error, the error monitoring unit 222 increments the error score within the error score table 250 corresponding to the HDD in which the occurrence of an error is detected. The error monitoring unit 222 may increment the error score corresponding to the HDD in which an error is detected also when notified of error detection from the access controller 221 at the time of access to the HDD in response to a request from the host device 400.

Further, when the error score within the error score table 250 reaches a predetermined threshold value, the error monitoring unit 222 determines that the HDD corresponding to the error score having reached the threshold value has failed. At this time, the error monitoring unit 222 notifies the rebuild controller 223 of that a failure has occurred along with the identification information of the failed HDD. The error monitoring unit 222 may, for example, determine that the HDD has failed and notify the rebuild controller 223 of that regardless of the error score also when detecting a serious error, such as that it is impossible to connect to the HDD to be accessed, at the time of the patrol processing and the processing to access the HDD by the access controller 221.

When the error monitoring unit 222 detects a failure of the HDD within the drive enclosure 300, the rebuild controller 223 causes the access controller 221 to perform "rebuild processing" to rebuild the data recorded in the failed HDD and to store the data in another HDD. As will be described later, the rebuild controller 223 determines the data storage destination by the rebuild processing to one of a hot spare HDD and a new HDD replaced with the failed HDD in accordance with the past error occurrence conditions of other HDDs belonging to the same RAID group to which the failed HDD has belonged based on the error score of the error score table 250.

Further, after causing the access controller 221 to perform the rebuild processing using the hot spare HDD as the data storage destination, the rebuild controller 223 causes the access controller 221 to perform "copy back processing" to write back the data of the hot spare HDD to the new HDD after the replacement.

Furthermore, the rebuild controller 223 changes the RAID level to be applied to the access controller 221 by updating information of the disk management table 230 and the RAID management table 240 accompanying the control of performing the rebuild processing and the copy back processing.

Figure 5:
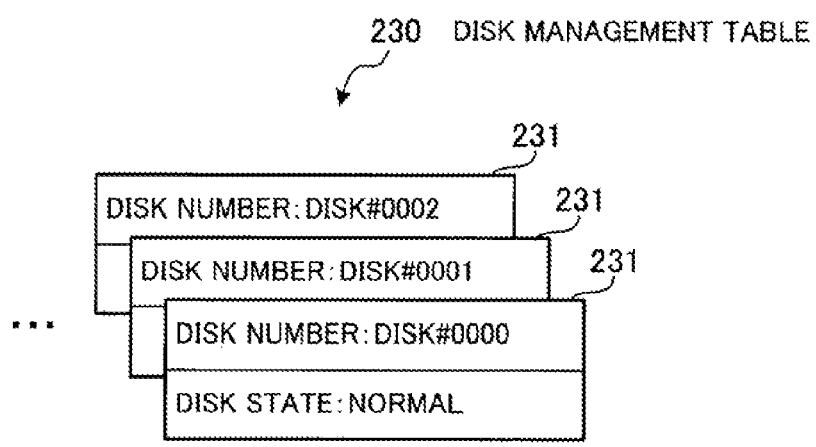
FIG. 5 illustrates an example of information to be registered in a disk management table.

FIG. 5 illustrates an example of information to be registered in a disk management table. In the disk management table 230, a record 231 is provided for each HDD within the drive enclosure 300. In each record 231, "disk number" to identify an HDD and "disk state" indicative of the state of an HDD are registered.

The "disk number" is a number for the controller module 201 to manage each HDD connected to the controller module 201 and may be, for example, one to indicate the position of an HDD in the drive enclosure 300. As in the example of FIG. 5, it is assumed that the disk number is expressed by "DISK #xxxx" and in the following explanation, an HDD the disk number of which is "DISK #xxxx" is simply called a "DISK #xxxx".

In the "disk state", by the processing of the rebuild controller 223, for example, information indicative of any of "normal", "normal HS", "failed", and "during being built" is set.

The "normal" indicates that the corresponding HDD operates normally. However, when the corresponding HDD operates normally and the HDD is set as a hot spare, the "normal HS" is set in the disk state. In the initial state of the storage system 100, an HDD corresponding to a disk number determined in advance of the HDDs within the drive enclosure 300 is set as a hot spare.

The "failed" indicates that the corresponding HDD has failed. The disk state is set to the "failed" when the error monitoring unit 222 determines that the corresponding HDD has failed. Until the HDD determined to have failed is replaced with a new HDD, the disk state is left set to the "failed".

The "during being built" indicates that the rebuild processing or copy back processing is being performed using the corresponding HDD as the storage destination.

Figure 6:
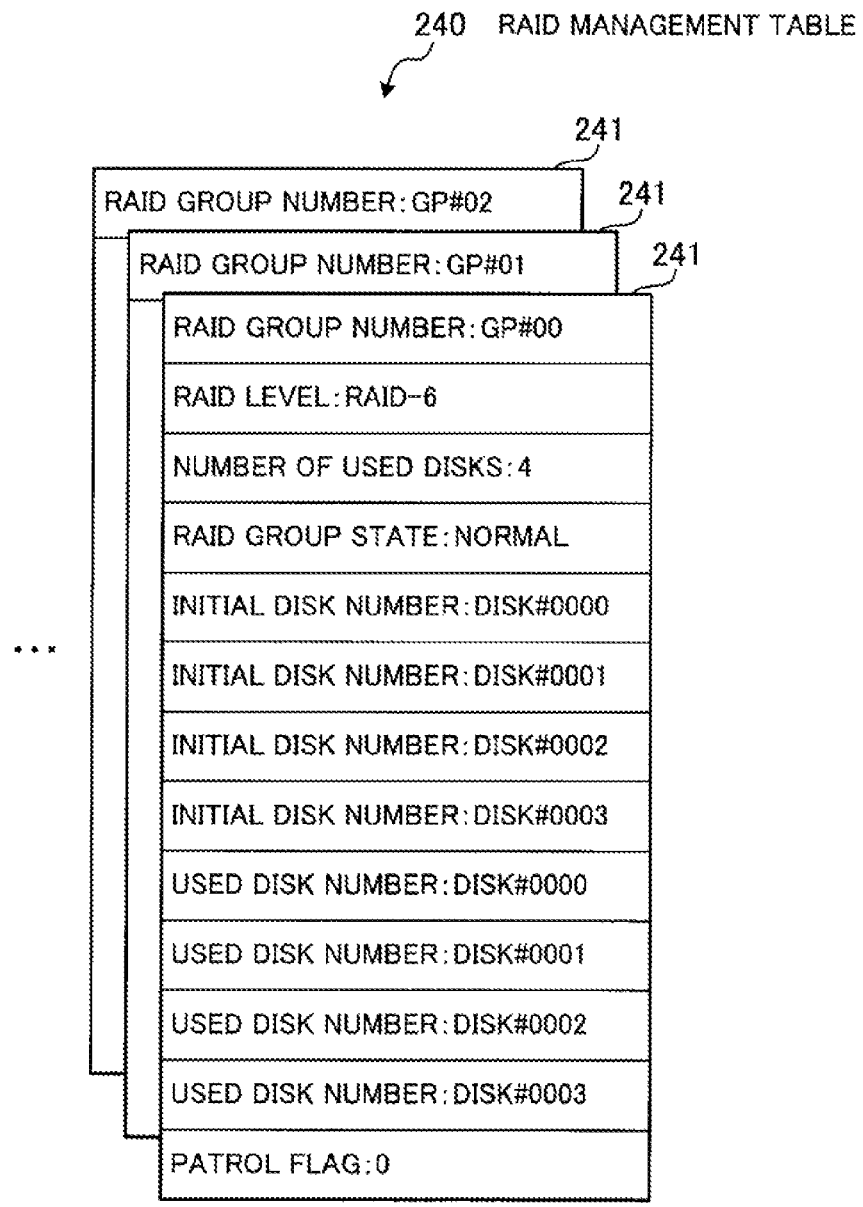
FIG. 6 illustrates an example of information to be registered in a RAID management table.

FIG. 6 illustrates an example of information registered in a RAID management table. In the RAID management table 240, a record 241 is provided for each RAID group set in the controller module 201. In each record 241, "RAID group number", "RAID level", "number of used disks", "RAID group state", "initial disk number", "used disk number", and "patrol flag" are registered.

The "RAID group number" is information for identifying a RAID group. The "RAID level" indicates the RAID level set to the corresponding RAID group. The "number of used disks" indicates the number of HDDs belonging to the corresponding RAID group.

The "RAID group state" is information indicating whether the corresponding RAID group is normally operated. In the "RAID group state", by the processing of the rebuild controller 223, for example, information indicating any one of "normal", "degenerated", "during rebuild", "during copy back", "HS in use", and "anomalous" is set.

The "normal" indicates that the corresponding RAID group is operated normally. The "degenerated" may be set only when the RAID level is set to RAID-6. The "degenerated" indicates a state where one of the HDDs belonging to the corresponding RAID group is degenerated due to a failure and the operation is continued by RAID-5 using the remaining HDDs.

The "during rebuild" indicates that the rebuild processing is being performed using one of the HDDs belonging to the corresponding RAID group as a storage destination. The "during copy back" indicates that the copy back processing is being performed using one of the HDDs belonging to the corresponding RAID group as a storage destination.

The "HS in use" indicates that the corresponding RAID group is operated normally, but, one of the HDDs belonging to the RAID group is a hot spare. The "anomalous" indicates a state where the corresponding RAID group is no longer operable. For example, indicated is the state where it is not possible to make data redundant due to a failure of an HDD belonging to the RAID group.

Both the "initial disk number" and the "used disk number" indicate HDDs belonging to the corresponding RAID group. The box of the "initial disk number" is provided in the same number as that set in the "number of used disks". The box of the "used disk number" is also provided in the same number as that set in the "number of used disks".

The "initial disk number" indicates the disk number of the HDD initially set as an HDD belonging to the corresponding RAID group. When the "RAID group state" is the "normal", the HDD corresponding to the number set in the "initial disk number" is used actually. In the "initial disk number", the disk number indicating a hot spare HDD is not set.

The "used disk number" indicates the disk number of the HDD currently used actually as one belonging to the corresponding RAID group. When the "RAID group state" is the "normal", the disk numbers set in the "used disk number", respectively, agree with the disk numbers set in the "initial disk number", respectively. On the other hand, for example, when the "RAID group state" is the "HS in use", one "used disk number" indicates the disk number of the hot spare HDD and the disk number does not agree with the disk number set in the corresponding "initial disk number".

The "patrol flag" is flag information set by the rebuild controller 223 and indicates whether or not the patrol by the error monitoring unit 222 is enhanced. As will be described later, the patrol is enhanced in the state where the degree of data redundancy in the RAID group is lower than that in the normal state (specifically, when the RAID level is changed from RAID-6 to RAID-5). In the "patrol flag", "1" is set when the patrol is enhanced and "0" is set when the patrol is not enhanced. The initial value of the "patrol flag" is "0".

Figure 7:
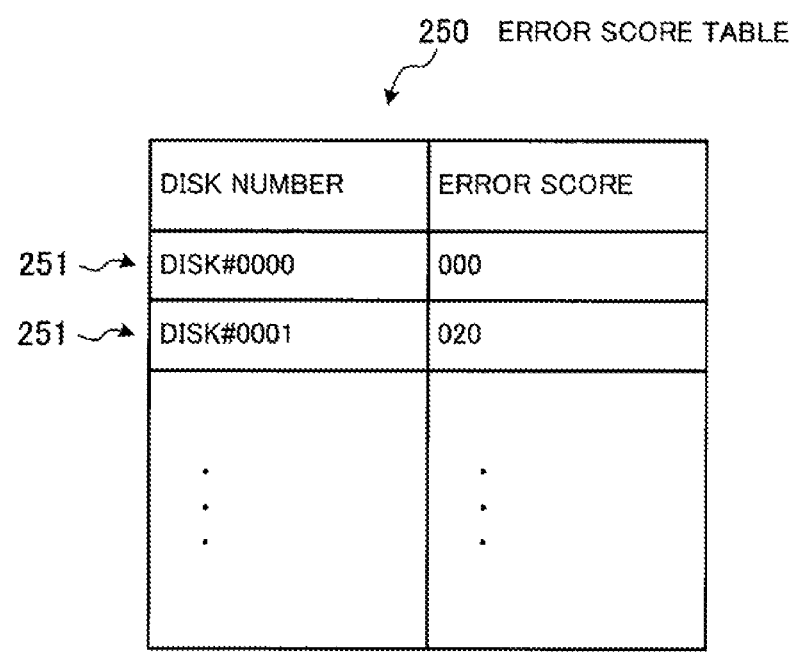

FIG. 7 illustrates an example of information registered in an error score table.

In the error score table 250, a record 251 is provided for each HDD within the drive enclosure 300. In each record 251, "disk number" to identify an HDD and "error score" incremented cumulatively each time an error is detected in the corresponding HDD by the error monitoring unit 222 are set. The initial value of the "error score" is "0".

Next, the rebuild processing and the copy back processing by the controller module 201 are explained.

The controller module 201 performs one of the rebuild processing for the hot spare HDD and the rebuild processing for the new HDD (hereinafter, referred to as a "replaced HDD") with which the failed HDD is replaced under the control of the rebuild controller 223 when one of the HDDs belonging to the corresponding RAID group has failed. Further, when performing the rebuild processing for the hot spare, the controller module 201 performs the copy back processing for the replaced HDD after the failed HDD is replaced.

Figure 8:
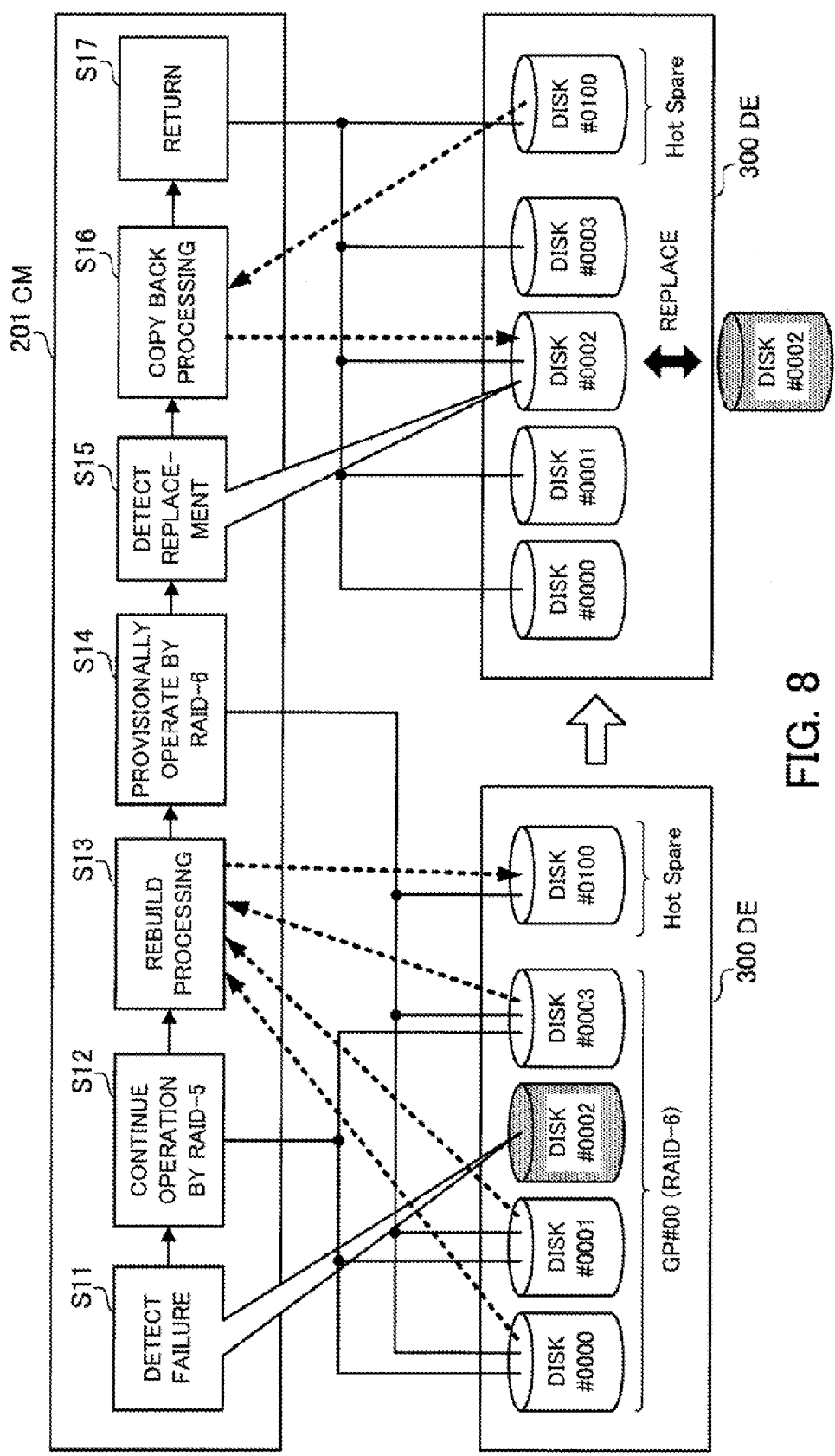
FIG. 8 illustrates a procedure example to perform rebuild processing for a hot spare and copy back processing.
Figure 9:
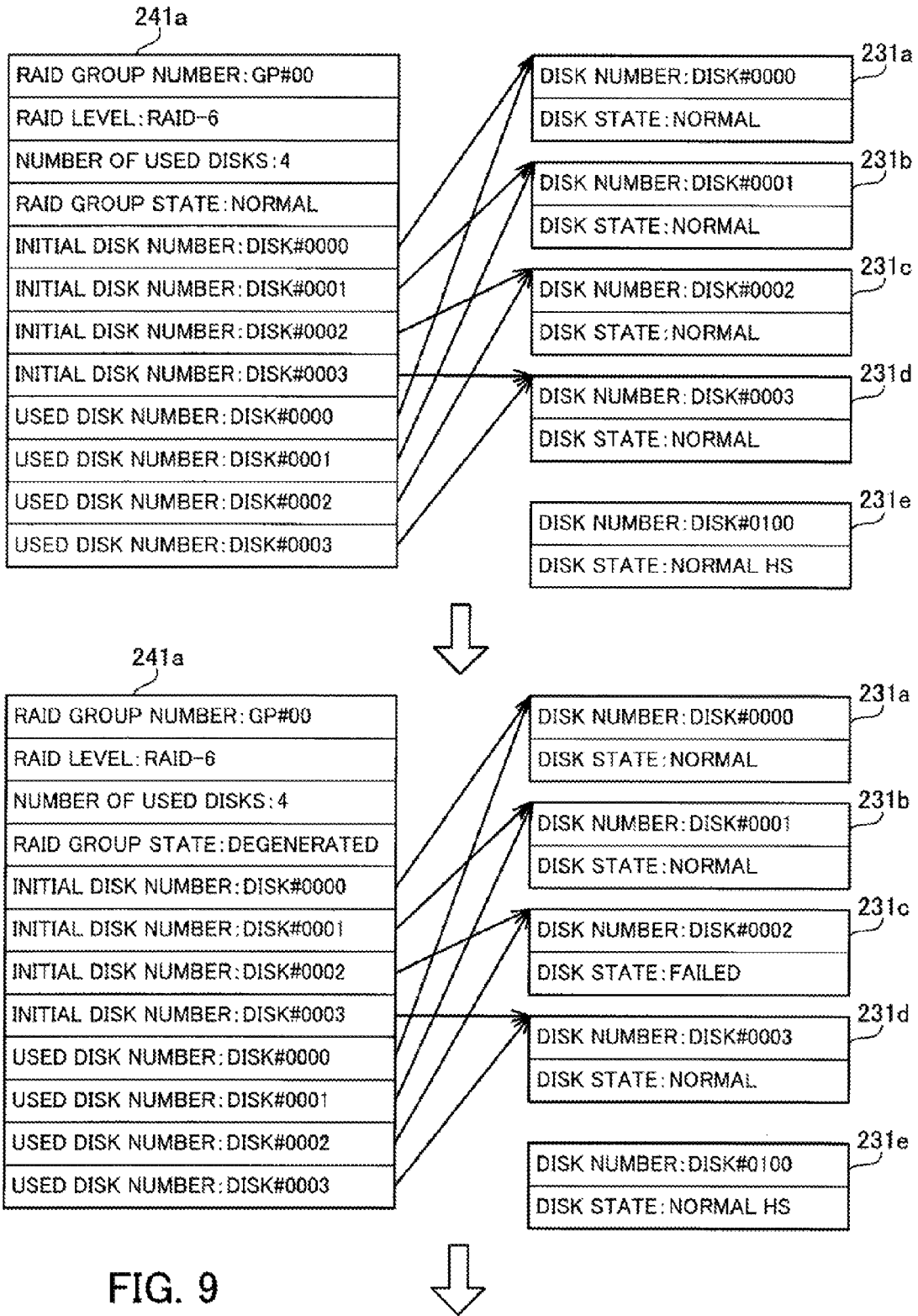
FIG. 9 is a diagram (of part 1) illustrating a transition example of the disk management table and the RAID management table when performing the processing of FIG. 8.
Figure 10:
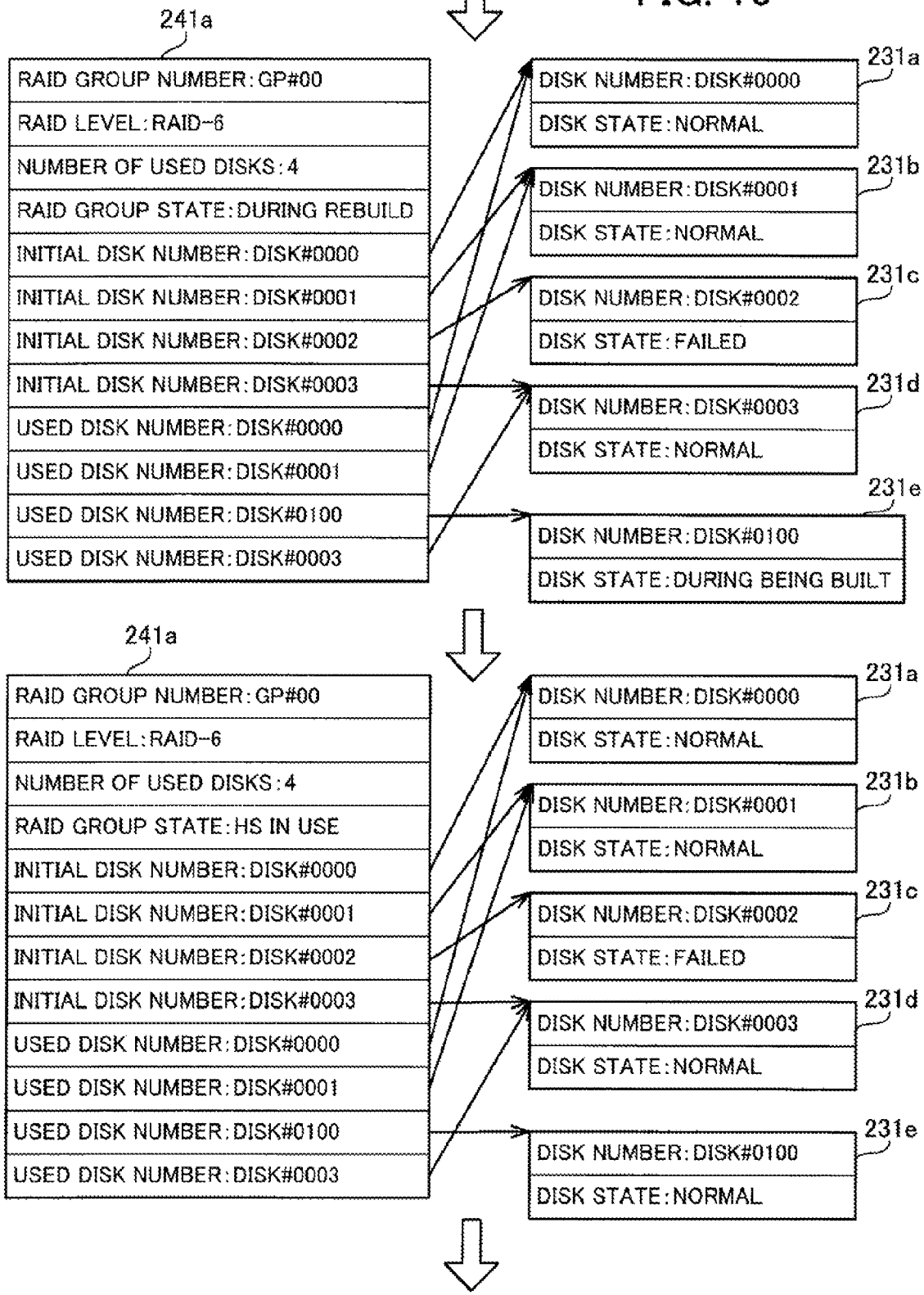
FIG. 10 is a diagram (of part 2) illustrating the transition example of the disk management table and the RAID management table when performing the processing of FIG. 8.
Figure 11:
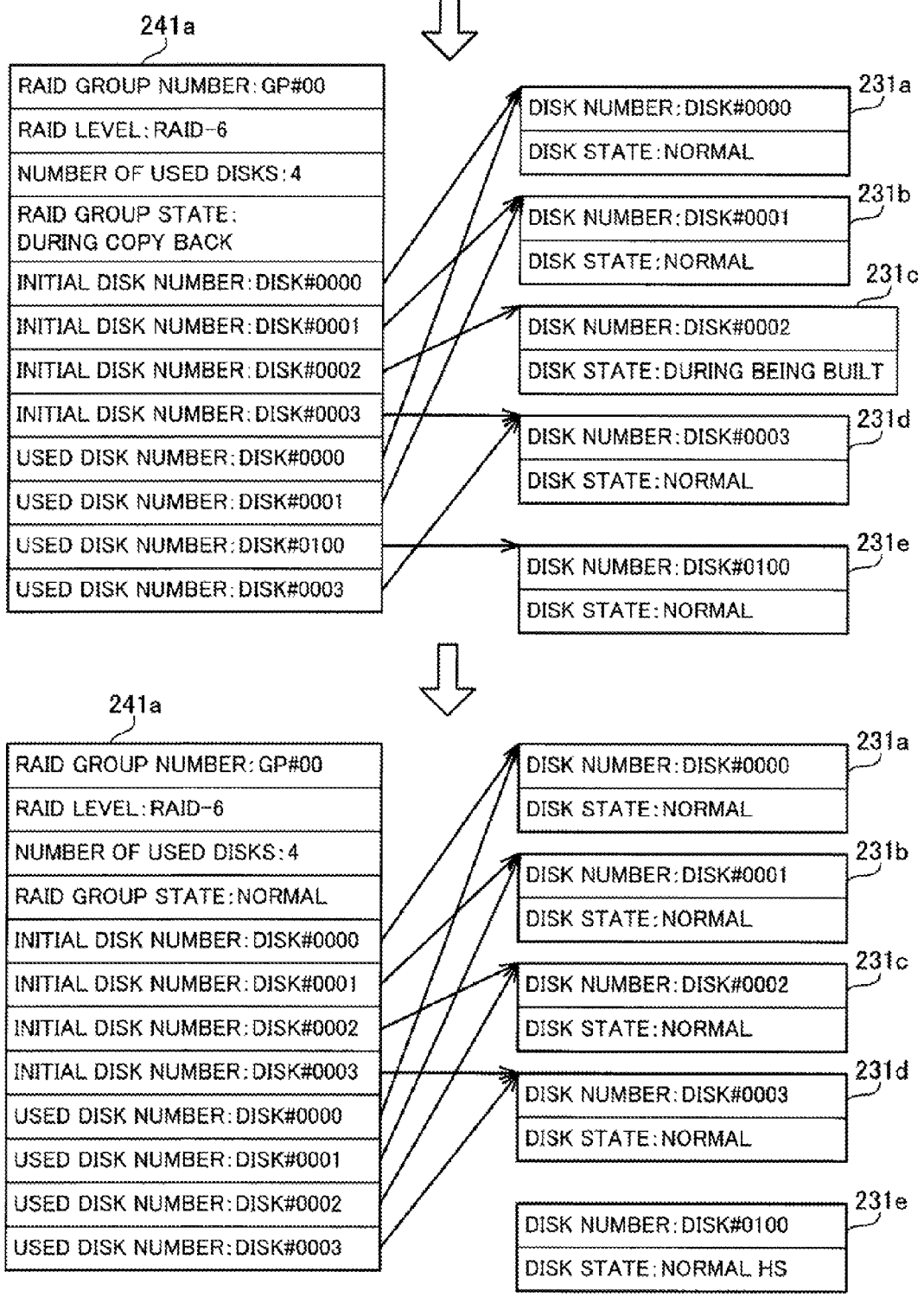
FIG. 11 is a diagram (of part 3) illustrating the transition example of the disk management table and the RAID management table when performing the processing of FIG. 8.

FIG. 8 illustrates a procedure example to perform the rebuild processing for the hot spare and the copy back processing. FIG. 9 to FIG. 11 illustrate transition examples of the disk management table and the RAID management table when performing the processing of FIG. 8. Using FIG. 8 to FIG. 11, the rebuild processing for the hot spare and the subsequent copy back processing are explained.

In the initial state of FIG. 8, for example, as illustrated on the lower-left side of FIG. 8, four DISK #0000 to DISK #0003 of the HDDs within the drive enclosure 300 belong to RAID group "GP #00" operated by RAID-6. DISK #0100 provided in the drive enclosure 300 is set as a hot spare.

FIG. 9 to FIG. 11 illustrate a record 241a corresponding to the RAID group "GP #00" of the record 241 of the RAID management table 240. Further, FIG. 9 to FIG. 11 also illustrate records 231a, 231b, 231c, 231d, and 231e corresponding to the DISKs #0000, #0001, #0002, #0003, and #0100, respectively, of the record 231 of the disk management table 230.

As illustrated on the upper side of FIG. 9, in the initial state where the RAID group "GP #00" is operated normally, in the "RAID group state" in the record 241a of the RAID management table 240, the "normal" is set and both in the "initial disk number" and in the "used disk number", the DISK #0000 to DISK #0003 are set. In the records 231a to 231d of the disk management table 230 corresponding to the disk numbers, respectively, set in the "initial disk number", the "normal" is set in each "disk state". Further, in the record 231e of the disk management table 230 corresponding to the hot spare DISK #0100, the "normal HS" is set in the "disk state".

In the state described above, it is assumed that the error monitoring unit 222 of the controller module 201 determines that the DISK #0002 has failed (step S11 of FIG. 8). The error monitoring unit 222 notifies the rebuild controller 223 of that the DISK #0002 has failed. The rebuild controller 223 updates the "RAID group state" of the record 241a corresponding to the RAID group "GP #00" to the "degenerated" and at the same time, updates the "disk state" of the record 231c corresponding to the DISK #0002 to the "failed" as illustrated on the lower side of FIG. 9.

By such table update processing, the rebuild controller 223 causes the access controller 221 to continue the operation of the RAID group "GP #00" by RAID-5, the degree of data redundancy of which is reduced (step S12 of FIG. 8). The access controller 221, when recognizing that the "RAID group state" of the record 241a corresponding to the RAID group "GP #00" is updated to the "degenerated" and the "disk state" of the record 231c corresponding to the DISK #0002 is updated to the "failed", performs data recording control by RAID-5 using the DISKs #0000, #0001, and #0003 other than the failed HDD.

The rebuild controller 223 performs determination processing, to be described later, and as a result of that, determines the hot spare DISK #0100 to be the data storage destination in the rebuild processing. The rebuild controller 223 updates the "RAID group state" to the "during rebuild" in the record 241a corresponding to the RAID group "GP #00" and at the same time, updates the "used disk number" in which the DISK #0002 has been set to the DISK #0100 as illustrated on the upper side of FIG. 10. Further, the rebuild controller 223 updates the "disk state" of the record 231e corresponding to the hot spare DISK #0100 to the "during being built".

By such table update processing, the rebuild controller 223 causes the access controller 221 to start the rebuild processing for the hot spare DISK #0100 (step S13 of FIG. 8). The access controller 221 recognizes that the "RAID group state" of the record 241a corresponding to the RAID group "GP #00" is updated to the "during rebuild". At the same time, the access controller 221 recognizes that the data storage destination in the rebuild processing is the DISK #0100 because the "used disk number" corresponding to the failed HDD is updated to the DISK #0100. The access controller 221 rebuilds the data recorded in the failed DISK #0002 and stores the data in the hot spare DISK #0100 based on the data recorded in the DISKs #0000, #0001, and #0003.

While the rebuild processing for the DISK #0100 is being performed, the access controller 221 also continues the processing to access the HDD belonging to the RAID group "GP #00" in response to a request from the host device 400.

Here, the method for rebuilding data in the rebuild processing is explained complementarily.

In the state where the RAID group "GP #00" is operated normally, the access controller 221 divides the data to be written from the host device 400 into stripes and calculates first and second parities by different calculation methods based on two stripes (first and second stripes) of the divided stripes. The access controller 221 records four pieces of data, that is, the first and second stripes and the first and second parities in the four DISKs #0000 to #0003 belonging to the RAID group "GP #00" in such a manner that one piece of data is allocated to one HDD. Further, the access controller 221 sequentially changes the allocation method of the first and second stripes and the first and second parities to the DISKs #0000 to #0003.

When rebuilding the first stripe recorded in the failed DISK #0002, the access controller 221 reads the second stripe and the first parity or the second parity from two of the remaining DISKs #0000, #0001, and #0003 and restores the first stripe by calculation based on the read data. When rebuilding the second stripe recorded in the failed DISK #0002 also, the access controller 221 similarly reads the first stripe and the first parity or the second parity from two of the remaining DISKs #0000, #0001, and #0003 and restores the second stripe by calculation based on the read data. When rebuilding the first parity or the second parity recorded in the failed DISK #0002, the access controller 221 reads the first and second stripes from two of the remaining DISKs #0000, #0001, and #0003 and recalculates the first parity or the second parity based on the read data.

When the rebuild processing for the DISK #0100 is completed, the rebuild controller 223 updates the "RAID group state" of the record 241a corresponding to the RAID group "GP #00" to the "HS in use" and at the same time, updates the "disk state" of the record 231a corresponding to the DISK #0100 to the "normal" as illustrated on the lower side of FIG. 10.

By such table update processing, the rebuild controller 223 causes the access controller 221 to provisionally operate the RAID group "GP #00" by RAID-6 using the hot spare HDD (step S14 of FIG. 8). The access controller 221, when recognizing that the "RAID group state" of the record 241a corresponding to the RAID group "GP #00" is updated to the "HS in use" and the "disk state" of the record 231c corresponding to the DISK #0100 is updated to the "failed", performs data recording control by RAID-6 using the DISKs #0000, #0001, #0100, and #0003 set in the "used disk" of the record 241a.

After that, the failed DISK #0002 is replaced with a new HDD by an administrator. The rebuild controller 223 detects that the DISK #0002 is replaced through, for example, the access controller 221 (step S15 of FIG. 8). The rebuild controller 223 having detected that the DISK #0002 is replaced updates the "RAID group state" of the record 241a corresponding to the RAID group "GP #00" to the "during copy back" and at the same time, updates the "disk state" of the record 231c corresponding to the DISK #0002 to the "during being built" as illustrated on the upper side of FIG. 11.

By such table update processing, the rebuild controller 223 causes the access controller 221 to start the copy back processing for the DISK #0002 (step S16 of FIG. 8). The access controller 221 recognizes that the "RAID group state" of the record 241a corresponding to the RAID group "GP #00" is updated to the "during copy back". At this time, the access controller 221 recognizes that the data storage destination in the copy back processing is the DISK #0002 because the "disk state" of the record 231c corresponding to the DISK #0002 of the HDDs set in the "initial disk number" is updated to the "during being built" and at the same time, recognizes that the data in the copy back processing is read from the DISK #0100 set in the "used disk number" corresponding to the "initial disk number" in which the DISK #0002 is set. The access controller 221 transfers the data recorded in the DISK #0100 to the DISK #0002.

While the copy back processing for the DISK #0002 is being performed, the access controller 221 also continues the processing to access the HDD belonging to the RAID group "GP #00" in response to a request from the host device 400.

When the copy back processing for the DISK #0002 is completed, the rebuild controller 223 updates the "RAID group state" of the record 241a corresponding to the RAID group "GP #00" to the "normal" and at the same time, updates the "disk state" of the record 231c corresponding to the DISK #0002 to the "normal" as illustrated on the lower side of FIG. 11. By such table update processing, the rebuild controller 223 returns the RAID group "GP #00" to the normal operating state (step S17 of FIG. 8).

The access controller 221, when recognizing that the "RAID group state" of the record 241a corresponding to the RAID group "GP #00" is updated to the "normal", performs data recording control by RAID-6 using the DISKs #0000 to #0003 set in the "used disk" of the record 241a.

Further, the rebuild controller 223 updates the "disk state" of the record 231e corresponding to the DISK #0100 to the "normal HS" and returns the state to a state where the DISK #0100 may be used as a hot spare.

Figure 12:
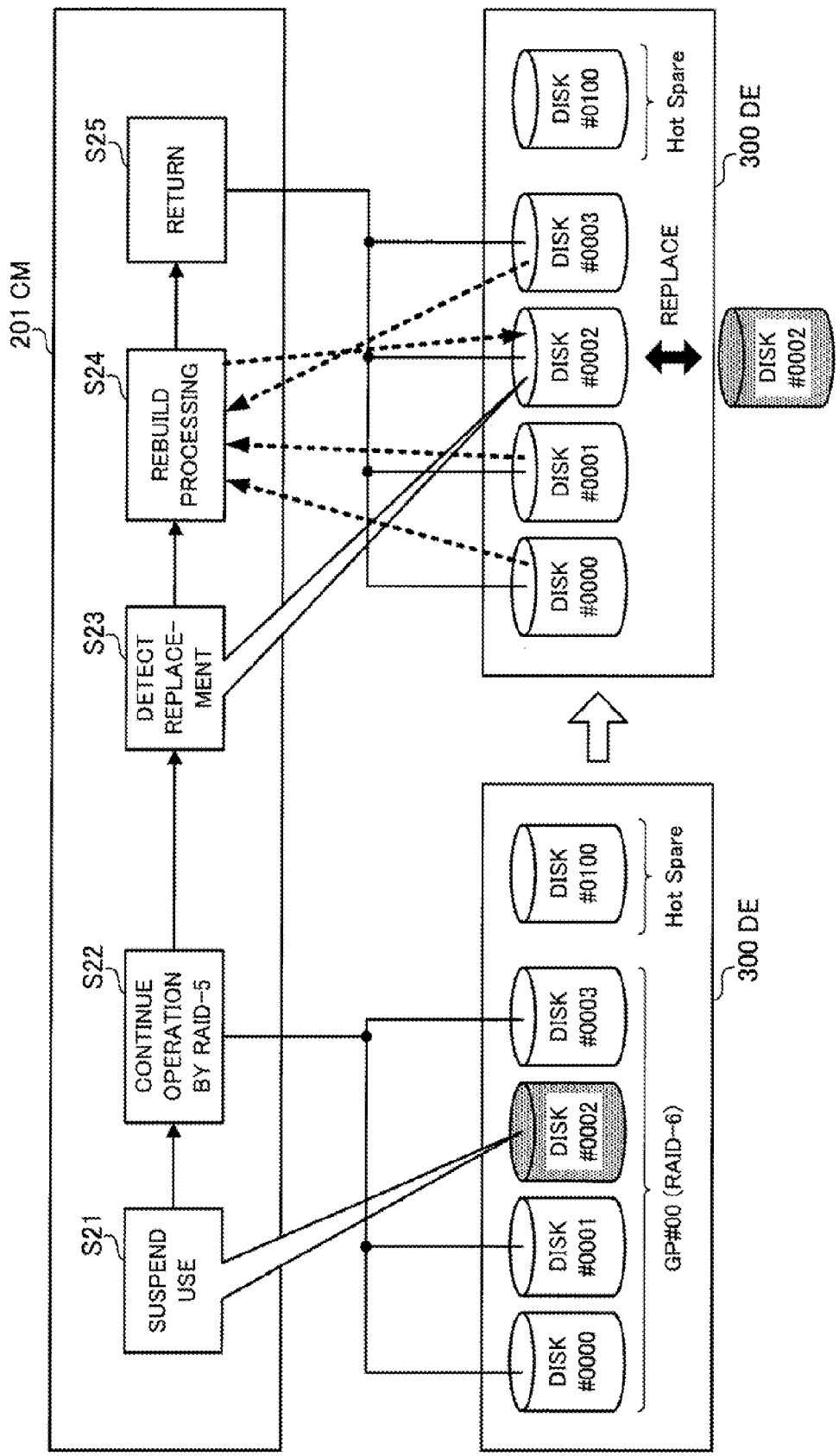
FIG. 12 illustrates a procedure example to perform rebuild processing for a replaced HDD.
Figure 13:
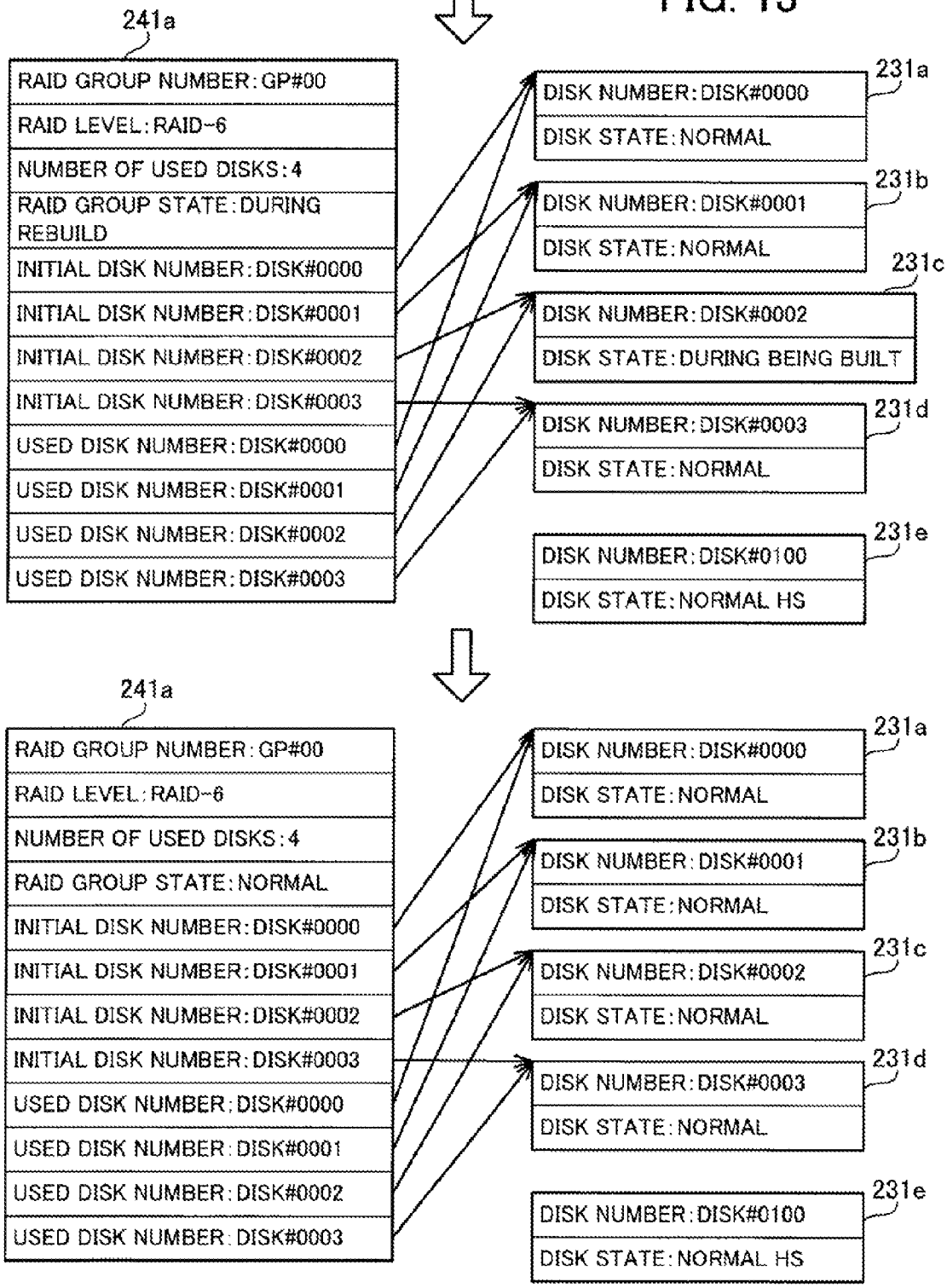
FIG. 13 illustrates a transition example of the disk management table and the RAID management table when performing the processing of FIG. 12.

Next, FIG. 12 illustrates a procedure example to perform the rebuild processing for the replaced HDD. Further, FIG. 13 illustrates a transition example of the disk management table and the RAID management table when the processing of FIG. 12 is performed. The rebuild processing for the replaced HDD is explained using FIG. 12, FIG. 13, and FIG. 9 described previously.

In the initial state of FIG. 12, as in FIG. 8 described previously, the four DISK #0000 to DISK #0003 of the HDDs within the drive enclosure 300 belong to the RAID group "GP #00" operated by RAID-6. The DISK #0100 provided in the drive enclosure 300 is set as a hot spare. At this time, the record 241a corresponding to the RAID group "GP #00" and the records 231a to 231e corresponding to the DISKs #0000 to #0003 and #0100, respectively, are in the state illustrated on the upper side of FIG. 9.

It is assumed that the error monitoring unit 222 of the controller module 201 determines that the DISK #0002 has failed in this state (step S21 of FIG. 12). The error monitoring unit 222 notifies the rebuild controller 223 of that the DISK #0002 has failed. The rebuild controller 223 updates the "RAID group state" of the record 241a corresponding to the RAID group "GP #00" to the "degenerated" and at the same time, updates the "disk state" of the record 231c corresponding to the DISK #0002 to the "failed" as illustrated on the lower side of FIG. 9. By such table update processing, the operation of the RAID group "GP #00" is continued by RAID-5 (step S22 of FIG. 12).

The rebuild controller 223 performs determination processing, to be described later, and determines that the data storage destination in the rebuild processing is the HDD after replacement as a result of the determination processing. In this case, the rebuild controller 223 monitors whether the failed DISK #0002 is replaced with a new HDD. Then, the rebuild controller 223, when detecting that the DISK #0002 is replaced with a new HDD (step S23 of FIG. 12), updates the "RAID group state" of the record 241a corresponding to the RAID group "GP #00" to the "during rebuild" and at the same time, updates the "disk state" of the record 231c corresponding to the DISK #0002 to the "during being built" as illustrated on the upper side of FIG. 13.

By such table update processing, the rebuild controller 223 causes the access controller 221 to start the rebuild processing for the DISK #0002 (step S24 of FIG. 12). The access controller 221 recognizes that the "RAID group state" of the record 241a corresponding to the RAID group "GP #00" is updated to the "during rebuild". At this time, the access controller 221 recognizes that the data storage destination in the rebuild processing is the DISK #0002 because the "disk state" of the record 231c corresponding to the DISK #0002 having been in the failed state is updated to the "during being built". The access controller 221 rebuilds the data recorded in the failed DISK #0002 before the replacement based on the data recorded in the DISKs #0000, #0001, and #0003 and stores the rebuilt data in the replaced DISK #0002.

When the rebuild processing for the DISK #0002 is completed, the rebuild controller 223 updates the "RAID group state" of the record 241a corresponding to the RAID group "GP #00" to the "normal" and at the same time, updates the "disk state" of the record 231c corresponding to the DISK #0002 to the "normal" as illustrated on the lower side of FIG. 13. By such table update processing, the rebuild controller 223 returns the RAID group "GP #00" to the normal operating state (step S25 of FIG. 12).

The access controller 221, when recognizing that the "RAID group state" of the record 241a corresponding to the RAID group "GP #00" is updated to the "normal", performs data recording control by RAID-6 using the DISKs #0000 to #0003 set in the "used disk" of the record 241a.

When the rebuild processing is performed for the hot spare HDD, as illustrated in FIG. 8, it is possible to start the rebuild processing by allocating the hot spare HDD for the data storage destination immediately after the HDD belonging to the RAIG group has failed. Although the degree of redundancy is reduced during the period until the rebuild processing is completed, it is possible to return the degree of data redundancy to the original state when the rebuild processing is completed. Consequently, it is possible to maintain the safety of the data recorded in the HDD at a relatively high level.

However, the hot spare HDD is merely a temporary data storage destination, and therefore, when the rebuild processing for the hot spare HDD is performed, the necessity to perform the copy back processing for the replaced HDD will arise after that. The copy back processing includes processing to read data from the normal HDD of the HDDs belonging to the RAID group, calculation processing in the controller module 201 based on the read data, etc. Because of this, when the copy back processing is performed while continuing the access control processing in response to a request from the host device 400, the burden of access processing in the HDD belonging to the RAID group and the burden of processing of the CPU 211 of the controller module 201 will increase. Due to this, such a problem arises that there is a possibility that the response speed for an access request from the host device 400 is reduced. In the worst case, there is a possibility that the access to the HDD in response to a request from the host device 400 is not able to be performed.

In order to avoid such a problem, there may be users who desire to perform the rebuild processing for the replaced HDD without using a hot spare HDD when an HDD has failed. As illustrated in FIG. 12, in the case where the rebuild processing for the replaced HDD is performed, when the rebuild processing is completed, it is possible to operate the RAID group as originally operated without performing the copy back processing. As described above, when the copy back processing is not performed, it is possible to accordingly reduce the burden of access processing in the HDD and the burden of processing of the CPU 211 of the controller module 201, and therefore, it is possible to reduce the possibility that the response speed for an access request from the host device 400 is reduced.

However, when performing the rebuild processing for the replaced HDD, the possibility becomes higher that the period of time from the occurrence of the failure of the HDD to the completion of the rebuild processing is lengthened. During the period until the rebuild processing is completed, the operation is continued with RAID-6 changed to RAID-5, and therefore, the state is brought about where the degree of data redundancy is reduced. Because of this, when performing the rebuild processing for the replaced HDD, there arises such a problem that the safety of the data recorded in the HDD is reduced compared to the case where the rebuild processing for the hot spare HDD is performed. During the period until the rebuild processing is completed, the operation is continued by RAID-5, and therefore, if another HDD fails, the degree of data redundancy is lost. Further, if two HDDs fail in the state where the operation is continued by RAID-5, part of data will be lost. Then, the longer the period until the failed HDD is replaced, the lower the level of safety of recorded data becomes.

When one HDD belonging to the RAID group has failed, the controller module 201 of the present embodiment determines whether the state where the degree of data redundancy is reduced is a state where it is possible to maintain the safety of the recorded data at a certain level. When determining that it is possible to maintain the safety of the recorded data at a certain level, the controller module 201 performs the rebuild processing using the replaced HDD as the data storage destination after the failed HDD is replaced. Due to this, the burden of access in the HDD and the burden of processing of the controller module 201 are reduced while maintaining the safety of the recorded data at a certain level. On the other hand, when determining that it is not possible to maintain the safety of the recorded data, the controller module 201 performs the rebuild processing using the hot spare HDD as the data storage destination and prevents the level of the safety of the recorded data from decreasing remarkably.

As described above, by automatically determining whether to set the replaced HDD or the hot spare HDD as the data storage destination at the time of rebuild processing, it is made possible to maintain the safety of the recorded data at a certain level while meeting the user desire to maintain the response speed for an access request from the host device 400.

Hereinafter, the processing of the controller module 201 is explained using a flowchart. In the following processing of FIG. 14 and FIG. 15, it is assumed that the RAID level set to the RAID group of processing target is RAID-6.

Figure 14:
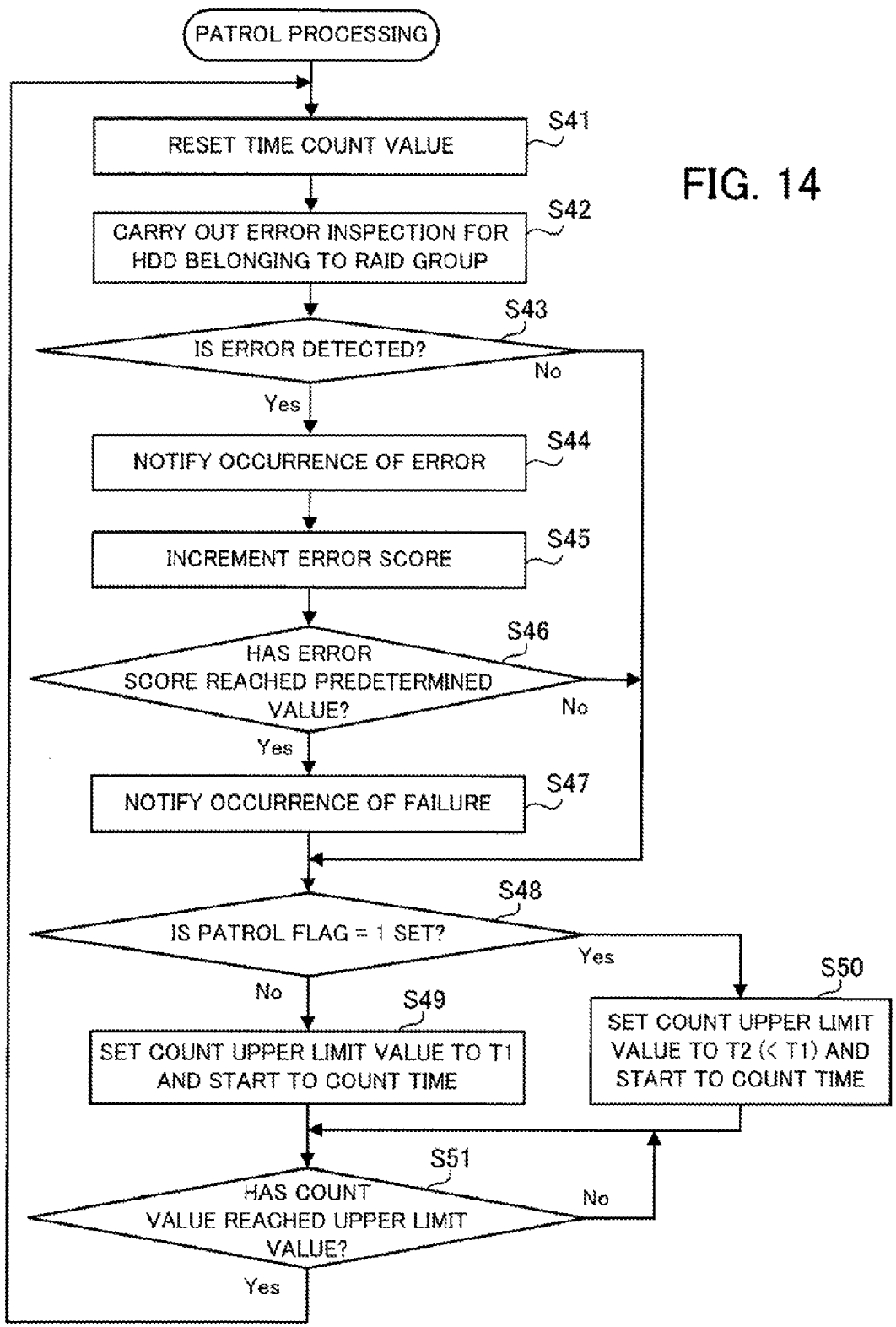
FIG. 14 is a flowchart illustrating a procedure example of patrol processing by an error monitoring unit.

First, FIG. 14 is a flowchart illustrating a procedure example of patrol processing by an error monitoring unit. The processing of FIG. 14 is performed for each RAID group registered in the RAID management table 240.

(Step S41) The error monitoring unit 222 resets the count value of the time counting function thereof to "0".

(Step S42) The error monitoring unit 222 causes the access controller 221 to carry out an error inspection for the HDD belonging to the RAID group.

Specifically, the error monitoring unit 222 reads the disk number set in the "initial disk number" from the record 241 corresponding to the RAID group of processing target within the RAID management table 240. Further, the error monitoring unit 222 selects the disk number whose "disk state" in the record 231 within the disk management table 230 corresponding to each disk number is set to the "normal" from among the read disk numbers and determines that the HDD corresponding to the selected disk number is the target for which the error inspection is carried out. The error monitoring unit 222 notifies the access controller 221 of the disk number of the HDD determined to be the target for which the error inspection is carried out and requests the access controller 221 to transmit a predetermined command to the HDD for which the error inspection is carried out.

The access controller 221 transmits a predetermined command to the HDD for which the error inspection is carried out in response to a request from the error monitoring unit 222. The access controller 221 determines, from the response to the command transmission, the presence or absence of the occurrence of an error in the HDD to which the command has been transmitted and notifies the error monitoring unit 222 of the determination result of an error for each HDD.

(Step S43) The error monitoring unit 222 determines whether an error has occurred in the HDD by carrying out the error inspection at step S42. When having received the notification of that an error has occurred in one or more HDDs from the access controller 221 (S43: Yes), the error monitoring unit 222 performs the processing of step S44. On the other hand, when having received the notification of that no error has occurred in all the HDDs from the access controller 221 (S43: No), the error monitoring unit 222 performs the processing of step S48.

(Step S44) The error monitoring unit 222 notifies the rebuild controller 223 of the disk number of the HDD in which an error has occurred. The processing of step S44 may be performed when it is determined that an error has occurred at step S43 and the determination result at step S48, to be described later, is "Yes".

(Step S45) The error monitoring unit 222 increments by "1" the error score of the error score table 250 corresponding to the HDD in which an error has occurred. The error monitoring unit 222 may add a different value in accordance with the kind of error that has occurred to the error score.

(Step S46) The error monitoring unit 222 determines whether the error score incremented at step S45 has reached a predetermined value. When the error score has reached a predetermined value (S46: Yes), the error monitoring unit 222 performs the processing of step S47 and on the other hand, when the error score has not yet reached the predetermined value (S46: No), the error monitoring unit 222 performs the processing of step S48.

(Step S47) The error monitoring unit 222 determines that the HDD the error score of which has reached the predetermined value has failed. The error monitoring unit 222 notifies the rebuild controller 223 of the disk number of the failed HDD and the RAID group to which the HDD belongs.

When one HDD has failed, the rebuild controller 223 having received the notification of the occurrence of a failure starts to perform the processing of FIG. 15, to be described later. However, when two or more HDDs have failed, the rebuild controller 223, for example, stops the operation of the RAID group.

(Step S48) The error monitoring unit 222 reads the value set to the patrol flag from the record 241 corresponding to the RAID group of processing target within the RAID management table 240 and determines whether the patrol is enhanced. When the patrol flag is "0" (S48: No), the error monitoring unit 222 determines that the patrol is not enhanced and performs the processing of step S49. On the other hand, when the patrol flag is "1" (S48: Yes), the error monitoring unit 222 determines that the patrol is enhanced and performs the processing of step S50.

(Step S49) The error monitoring unit 222 sets a count upper limit value to T1 (for example, 1.0 sec) and starts to count the time.

(Step S50) The error monitoring unit 222 sets the count upper limit value to T2 (for example, 0.2 sec) smaller than T1 and starts to count the time.

(Step S51) The error monitoring unit 222 determines whether the count value of the time has reached the count upper limit value set at step S49 or step S50 and when the count upper limit value has been reached (S51: Yes), the error monitoring unit 222 performs the processing of step S41. In this manner, the error inspection for the HDD is carried out again.

In the processing of FIG. 14 described above, when an error is detected in the HDD belonging to the RAID group of processing target (S43: Yes), the error monitoring unit 222 increments the error score corresponding to the HDD in which an error is detected (S45). At this time, when the incremented error score has reached a predetermined value (S46: Yes), the error monitoring unit 222 notifies the rebuild controller 223 of the occurrence of a failure (S47).

Note that the error monitoring unit 222 may notify the rebuild controller 223 of the occurrence of a failure regardless of the error score when, for example, a serious error is detected in the error inspection at step S42 or in the processing to access the HDD by the access controller 221 in response to a request from the host device 400.

Further, in the processing of FIG. 14, when the patrol flag is "1" (S48: Yes), the error monitoring unit 222 sets the interval shorter between error inspections than when the patrol flag is "0" (S48: No) (S50). Due to this, in the state where the patrol flag is "1", the patrol for the HDD belonging to the RAID group of processing target is enhanced.

FIG. 15 is a flowchart illustrating a procedure example of rebuild control processing by the rebuild controller. The processing of FIG. 15 is performed by the rebuild controller 223 when the error monitoring unit 222 notifies the rebuild controller 223 of that the HDD has failed at step S47 of FIG. 14.

The processing of FIG. 15 may be performed not only when the HDD has failed but also when the use of the HDD is stopped for some reason other than the occurrence of a failure.

(Step S61) The rebuild controller 223 receives notification of the disk number of the failed HDD and the RAID group to which the HDD belongs from the error monitoring unit 222. The rebuild controller 223 extracts the record 231 corresponding to the disk number notified from the error monitoring unit 222 from the disk management table 230 and updates the "disk state" in the extracted record 231 to the "failed" At the same time, the rebuild controller 223 extracts the record 241 corresponding to the RAID group notified from the error monitoring unit 222 from the RAID management table 240 and updates the "RAID group state" in the extracted record 241 to the "degenerated". Due to this, the rebuild controller 223 continues the operation of the RAID group to which the failed HDD belongs by RAID-5 with which the degree of data redundancy is reduced.

The processing of step S61 described above corresponds to step S12 of FIG. 8 or step S22 of FIG. 12.

(Step S62) The rebuild controller 223 initializes the count value of the time counting function thereof to "0" and starts to count the time.

(Step S63) The rebuild controller 223 selects one disk number from among the disk numbers set in the "initial disk number" and not selected yet in the record 241 extracted from the RAID management table 240 at step S61. However, the disk numbers to be selected at step S63 do not include the disk number of the HDD determined to have failed at step S61.

(Step S64) The rebuild controller 223 determines the past error occurrence conditions of the HDD indicated by the disk number selected at step S63 based on the error score table 250. Specifically, the rebuild controller 223 reads the error score corresponding to the disk number selected at step S63 from the error score table 250. When the read error score is equal to or greater than a predetermined threshold value Th (S64: Yes), the rebuild controller 223 performs the processing of step S73. On the other hand, when the error score is less than the threshold value Th (S64: No), the rebuild controller 223 performs the processing of step S65. Note that the threshold value Th may be set to an arbitrary number not less than one.

(Step S65) The rebuild controller 223 determines whether all the disk numbers set in the "initial disk number" of the record 241 extracted from the RAID management table 240 at step S61 have already been selected. When there is a disk number not selected yet (S65: No), the rebuild controller 223 performs the processing of step S63. On the other hand, when all the disk numbers have already been selected (S65: Yes), the rebuild controller 223 performs the processing of step S66.

(Step S66) The rebuild controller 223 updates the "patrol flag" of the record 241 extracted from the RAID management table 240 at step S61 from "0" to "1".

(Step S67) The rebuild controller 223 determines whether notification of the occurrence of an error in one of the HDDs indicated by the disk numbers selected at step S63 is received from the error monitoring unit 222. Notification of the occurrence of error is received at step S67 when the error monitoring unit 222 notifies the rebuild controller 223 of the occurrence of an error at step S44 of FIG. 14. When notification of the occurrence of an error is received (S67: Yes), the rebuild controller 223 performs the processing of step S72. On the other hand, when notification of the occurrence of an error is not received (S67: No), the rebuild controller 223 performs the processing of step S68.

(Step S68) The rebuild controller 223 determines whether a predetermined time T has elapsed after the start of counting of the time at step S62. When the time T has not elapsed yet (S68: No), the rebuild controller 223 performs the processing of step S69. On the other hand, when the time T has elapsed (S68: Yes), the rebuild controller 223 performs the processing of step S72.

(Step S69) The rebuild controller 223 determines whether the failed HDD is replaced with a new HDD. When detecting that an HDD is removed from the drive enclosure 300 and then another HDD is mounted to the position from which the HDD is removed, and communication with the mounted HDD is enabled, the access controller 221 notifies the rebuild controller 223 of that the HDD is replaced along with the disk number of the replaced HDD. When the replacement of the HDD is not detected (S69: No), the rebuild controller 223 performs the processing of step S67. On the other hand, when the replacement of the HDD is detected (S69: Yes), the rebuild controller 223 performs the processing of step S70.

(Step S70) The rebuild controller 223 returns the "patrol flag" of the record 241 extracted from the RAID management table 240 at step S61 to "0".

(Step S71) The rebuild controller 223 causes the access controller 221 to start the rebuild processing for the replaced HDD. This processing is the same as that explained at step S24 of FIG. 12. When the rebuild processing for the replaced HDD is completed, the rebuild controller 223 returns the RAID level of the RAID group for which the rebuild processing has been completed to RAID-6 and returns the operating state of the RAID group to the state before the HDD has failed as explained at step S25 of FIG. 12.

(Step S72) The rebuild controller 223 returns the "patrol flag" of the record 241 extracted from the RAID management table 240 at step S61 to "0".

(Step S73) The rebuild controller 223 causes the access controller 221 to start the rebuild processing for the hot spare HDD. The processing is the same as that explained at step S13 of FIG. 8. When the rebuild processing for the hot spare HDD is completed, the rebuild controller 223 performs the processing explained at steps S14 to S17 of FIG. 8.

In the processing of FIG. 15 described above, when an HDD belonging to the RAID group operated by RAID-6 has failed, the rebuild controller 223 determines the past error occurrence conditions of other HDDs belonging to the same RAID group (S64).

When the error score of any of the HDDs is equal to or greater than the threshold value Th (S64: Yes), the rebuild controller 223 estimates that the possibility is high that the HDDs other than the failed HDD belonging to the same RAID group fail in the future. In this case, the rebuild controller 223 determines that the rebuild processing should be performed as soon as possible in order to keep the safety of data and causes the access controller 221 to immediately perform the rebuild processing for the hot spare HDD (S73). Due to this, the length of the period during which the RAID group is operated by RAID-5 lower in data redundancy than that at the time of the normal operation is minimized and it is possible to reduce the probability of the occurrence of the state where the data redundancy is lost or part of data is lost when another HDD fails.

On the other hand, when the error score of all the HDDs is less than the threshold value Th (S64: No), the rebuild controller 223 estimates that the possibility is small that the HDDs belonging to the same RAID group other than the failed HDD fail in the future. In this case, the rebuild controller 223 determines that the safety of data is kept even if the rebuild processing is not performed during a certain period, and therefore, does not perform the rebuild processing until the failed HDD is replaced with a new HDD. Then, when the failed HDD is replaced with a new HDD (S69: Yes), the rebuild controller 223 causes the access controller 221 to perform the rebuild processing for the replaced HDD (S71). In this case, it is no longer necessary to perform the copy back processing, and therefore, the burden of access processing in the HDD within the RAID group and the burden of processing of the CPU 211 of the controller module 201 are reduced.

As described above, by performing the rebuild processing for the replaced HDD only when it is estimated that the possibility is small that the HDDs belonging to the same RAID group other than the failed HDD fail in the future, it is possible to reduce the burden of access processing in the HDD and the burden of processing of the CPU 211 of the controller module 201 while maintaining the safety of data at a certain level.

That is, it is made possible to maintain the safety of recorded data at a certain level while making it possible to respond to the desire of a user to maintain the response speed for an access request from the host device 400. Further, regardless of the user's desire to use the operation method in which the rebuild processing is performed immediately after an HDD has failed or the operation method in which the rebuild processing is performed after the failed HDD is replaced, one of the operation methods is selected automatically. Because of this, it is possible to obviate the necessity of the setting operation by the user and to prevent the setting from being forgotten or done erroneously while maintaining the safety of data at a certain level.

Further, there is a case where the replacement work of a failed HDD by a user is delayed for some reason. As the period until the rebuild processing is started is lengthened because of the delay in the replacement work of the HDD or other reason, the probability becomes high that other HDD belonging to the same RAID group fails. Because of this, the rebuild controller 223 causes the access controller 221 to perform the rebuild processing for the hot spare HDD (S73) when a failed HDD is not replaced during the period from the occurrence of a failure in the HDD until the elapse of the predetermined time T (S68: Yes) even when it is estimated that the possibility is small that an HDD other than the failed HDD fails in the future (S64: No). Due to this, it is possible to reduce the period during which the operation is performed by RAID-5 reduced in data redundancy to the time T or less, and therefore, the safety of data is improved.

Further, even when it is estimated that the possibility is small that an HDD other than the failed HDD fails in the future (S64: No), the rebuild controller 223 estimates that the possibility is high that an HDD other than the failed HDD fails when an error occurs in an HDD other than the failed HDD (S67: Yes) during the period from the occurrence of a failure in the HDD until the elapse of the predetermined time T. In this case, the rebuild controller 223 causes the access controller 221 to perform the rebuild processing for the hot spare HDD (S73). Due to this, it is made possible to prevent the safety of data from decreasing remarkably.

The rebuild controller 223 sets the patrol flag to "1" (S66) when estimating that the possibility is small that the HDD other than the failed HDD belonging to the same RAID group fails in the future (S64: No). Then, the rebuild controller 223 leaves the patrol flag at "1" until the rebuild processing is started. As illustrated in FIG. 14, in the state where the patrol flag is "1", the interval between the error inspections to be carried out for the HDDs other than the failed HDD is shortened (S50) and the patrol is enhanced. By shortening the interval between the error inspections to be carried out, it is made possible to detect the occurrence of a new error (S67) at an early timing. During the period during which the patrol flag is "1", the data redundancy is reduced, but, it is possible to detect the occurrence of a new error at an early timing as described above, and therefore, it is possible to prevent a further reduction in data redundancy and the occurrence of data loss.

In the second embodiment described above, a case is explained where in the normal operating state, the operation is performed by RAID-6 with which data is made redundant by being stored in three storage devices, but, it may also be possible to make data redundant by storing the data in two storage devices by applying, for example, RAIDs-1, 4, and 5 in the normal operating state. In this case, during the period from when one HDD belonging to the RAID group fails until the rebuild processing is completed, the state lasts where the data redundancy is lost, but, by performing the processing of FIG. 14 and FIG. 15, it is possible to reduce the probability that the data loss occurs.

According to the storage system, the storage control device, and the storage control method described above, it is made possible to determine a timing to perform the rebuild processing in accordance with the error occurrence conditions in the storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
   a plurality of storage devices; and
   a control device configured to control data recording in the plurality of storage devices so that data to be recorded in the plurality of storage devices is redundantly recorded in different storage devices,
   wherein the control device includes one or a plurality of processors configured to perform a procedure including:
   registering error information indicative of error occurrence conditions in an error score table in a memory for each storage device by monitoring an occurrence of an error in each of the plurality of storage devices, within a settable time limit; and
   determining, when the use of a first storage device of the plurality of storage devices is stopped, a timing to perform rebuild processing to generate data stored in the first storage device and to store the data in another storage device based on past error occurrence conditions in the storage devices other than the first storage device of the plurality of storage devices by referring to the error information,
   wherein the registering the error information registers an error score in accordance with the occurrence of an error in the error information for each storage device, and
   in a case where an error score corresponding to at least one storage device other than the first storage device of the plurality of storage devices is equal to or more than a predetermined value when the use of the first storage device is stopped, the determining a timing to perform the rebuild processing determines the timing so that the rebuild processing is performed at a timing earlier than a timing determined for a case where error scores corresponding to all the storage devices other than the first storage device are less than a predetermined value.

2. The storage system according to claim 1, further comprising a spare storage device to be used in place of any of the plurality of storage devices,
   wherein when the use of the first storage device is stopped, the determining a timing to perform the rebuild processing includes:
   generating the data stored in the first storage device and storing the data in the spare storage device in a case where an error score corresponding to at least one storage device other than the first storage device of the plurality of storage devices is equal to or more than the predetermined value; and
   generating, after detecting that the first storage device is replaced with a new storage device, the data stored in the first storage device, and storing the data in the new storage device in a case where error scores corresponding to all the storage devices other than the first storage device of the plurality of storage devices are less than the predetermined value.

3. The storage system according to claim 2, wherein after storing the data stored in the first storage device in the spare storage device and when detecting that the first storage device is replaced with a new storage device, the procedure further includes writing back the data stored in the spare storage device to the new storage device.

4. The storage system according to claim 2, wherein, in the case where error scores corresponding to all the storage devices other than the first storage device of the plurality of storage devices are less than the predetermined value when the use of the first storage device is stopped, the determining a timing to perform the rebuild processing monitors the time having elapsed from when the use of the first storage device is stopped, and when the first storage device is not replaced by the time a fixed time elapses, generates the data stored in the first storage device, and stores the data in the spare storage device.

5. The storage system according to claim 2, wherein, in the case where error scores corresponding to all the storage devices other than the first storage device of the plurality of storage devices are less than the predetermined value when the use of the first storage device is stopped, the determining a timing to perform the rebuild processing monitors the occurrence of an error in the storage devices other than the first storage device of the plurality of storage devices, and when an error occurs before the replacement of the first storage device is detected, generates the data stored in the first storage device, and stores the data in the spare storage device.

6. The storage system according to claim 5, wherein the monitoring the occurrence of an error in each of the plurality of storage devices is performed by periodically inspecting whether an error has occurred in each of the plurality of storage devices, and
   the procedure further includes, in the case where error scores corresponding to all the storage devices other than the first storage device of the plurality of storage devices are less than the predetermined value when the use of the first storage device is stopped, shortening the interval between the inspections of the occurrence of an error compared to the interval before the stoppage of the use of the first storage device until the first storage device is replaced.

7. A storage control apparatus that controls data recording in a plurality of storage devices so that data to be recorded in the plurality of storage devices is redundantly recorded in different storage devices, the storage control apparatus comprising:
    a memory configured to record error information indicative of error occurrence conditions in each of the plurality of storage devices for each storage device; and
    one or a plurality of processors configured to perform a procedure including:
        registering the error information in an error score table in the memory by monitoring an occurrence of an error in each of the plurality of storage devices, within a settable time limit; and
        determining, when the use of a first storage device of the plurality of storage devices is stopped, a timing to perform rebuild processing to generate data stored in the first storage device and to store the data in another storage device based on past error occurrence conditions in the storage devices other than the first storage device of the plurality of storage devices by referring to the error information,
    wherein the registering the error information registers an error score in accordance with the occurrence of an error in the error information for each storage device, and
    in a case where an error score corresponding to at least first storage device other than the first storage device of the plurality of storage devices is equal to or more than a predetermined value when the use of the first storage device is stopped, the determining a timing to perform the rebuild processing determines the timing so that the rebuild processing is performed at a timing earlier than a timing determined for a case where error scores corresponding to all the storage devices other than the first storage device are less than a predetermined value.

8. The storage control apparatus according to claim 7,
wherein when the use of the first storage device is stopped, the determining a timing to perform the rebuild processing includes:
    generating the data stored in the first storage device and storing the data in a spare storage device provided in advance in a case where an error score corresponding to at least one storage device other than the first storage device of the plurality of storage devices is equal to or more than the predetermined value; and
    generating, after detecting that the first storage device is replaced with a new storage device, the data stored in the first storage device and storing the data in the new storage device in a case where error scores corresponding to all the storage devices other than the first storage device of the plurality of storage devices are less than the predetermined value.

9. The storage control apparatus according to claim 8, wherein after storing the data stored in the first storage device in the spare storage device and when detecting that the first storage device is replaced with a new storage device, the procedure further includes writing back the data stored in the spare storage device to the new storage device.

10. The storage control apparatus according to claim 8, wherein, in the case where error scores corresponding to all the storage devices other than the first storage device of the plurality of storage devices are less than the predetermined value when the use of the first storage device is stopped, the determining a timing to perform the rebuild processing monitors the time having elapsed from when the use of the first storage device is stopped, and when the first storage device is not replaced by the time a fixed time elapses, generates the data stored in the first storage device, and stores the data in the spare storage device.

11. The storage control device according to claim 8, wherein, in the case where error scores corresponding to all the storage devices other than the first storage device of the plurality of storage devices are less than the predetermined value when the use of the first storage device is stopped, the determining a timing to perform the rebuild processing monitors the occurrence of an error in the storage devices other than the first storage device of the plurality of storage devices, and when an error occurs before the replacement of the first storage device is detected, generates the data stored in the first storage device, and stores the data in the spare storage device.

12. A storage control method in a storage system including a plurality of storage devices and a control device configured to control data recording in the plurality of storage devices so that data to be recorded in the plurality of storage devices is redundantly recorded in different storage devices, the storage control method comprising:
    registering, by the control device, error information indicative of error occurrence conditions in an error score table in a memory for each storage device by monitoring an occurrence of an error in each of the plurality of storage devices, within a settable time limit; and
    determining, by the control device, when the use of a first storage device of the plurality of storage devices is stopped, a timing to perform rebuild processing to generate data stored in the first storage device and to store the data in another storage device based on past error occurrence conditions in the storage devices other than the first storage device of the plurality of storage devices by referring to the error information,
    wherein the registering the error information registers an error score in accordance with the occurrence of an error in the error information for each storage device, and
    in a case where an error score corresponding to at least one storage device other than the first storage device of the plurality of storage devices is equal to or more than a predetermined value when the use of the first storage device is stopped, the determining a timing to perform the rebuild processing determines the timing so that the rebuild processing is performed at a timing earlier than a timing determined for a case where error scores corresponding to all the storage devices other than the first storage device are less than a predetermined value.

13. The storage control method according to claim 12, wherein when the use of the first storage device is stopped, the determining a timing to perform the rebuild processing includes:
    generating the data stored in the first storage device and storing the data in a spare storage device provided in advance in a case where an error score corresponding to at least one storage device other than the first storage device of the plurality of storage devices is equal to or more than the predetermined value; and
    generating, after detecting that the first storage device is replaced with a new storage device, the data stored in the first storage device and storing the data in the new storage device in a case where error scores corresponding to all the storage devices other than the first storage device of the plurality of storage devices are less than the predetermined value.

14. The storage control method according to claim 13, further comprising, after storing the data stored in the first storage device in the spare storage device and when detecting that the first storage device is replaced with a new storage device, writing back the data stored in the spare storage device to the new storage device.

15. The storage control method according to claim 13, wherein, in the case where error scores corresponding to all the storage devices other than the first storage device of the plurality of storage devices are less than the predetermined value when the use of the first storage device is stopped, the determining a timing to perform the rebuild processing monitors the time having elapsed from when the use of the first storage device is stopped, and when the first storage device is not replaced by the time a fixed time elapses, generates the data stored in the first storage device, and stores the data in the spare storage device.

16. The storage control method according to claim 13, wherein, in the case where error scores corresponding to all the storage devices other than the first storage device of the plurality of storage devices are less than the predetermined value when the use of the first storage device is stopped, the determining a timing to perform the rebuild processing monitors the occurrence of an error in the storage devices other than the first storage device of the plurality of storage devices, and when an error occurs before the replacement of the first storage device is detected, generates the data stored in the first storage device, and stores the data in the spare storage device.

17. The storage control method according to claim 16, wherein the monitoring the occurrence of an error in each of the plurality of storage devices is performed by periodically inspecting whether an error has occurred in each of the plurality of storage devices, and the storage control method further includes, in the case where error scores corresponding to all the storage devices other than the first storage device of the plurality of storage devices are less than the predetermined value when the use of the first storage device is stopped, shortening the interval between the inspections of the occurrence of an error compared to the interval before the stoppage of the use of the first storage device until the first storage device is replaced.

18. A storage system comprising:
a plurality of storage devices including a first storage device;
a spare storage device to be used in place of any of the plurality of storage devices; and
a control device that controls data recording in the storage devices so that data be recorded redundantly in different storage devices, the control device including a processor that performs a procedure including:
monitoring errors in each of the storage devices and registering error information in an error score table in a memory to record past errors, within a settable time limit in the storage devices; and
determining, when use of the first storage device is stopped, whether to either generate in the spare storage device the data originally stored in the first storage device or detect removal of the first storage device from the storage system and subsequent mounting of a new storage device as a replacement therefor and then generate, in the new storage device instead of the spare storage device, the data originally stored in the first storage device, based on the error information indicating the past errors in other storage devices than the first storage device.

19. A storage control apparatus that controls data recording in a storage system formed from a plurality of storage devices and a spare storage device, the plurality of storage devices including a first storage device, so that data be recorded redundantly in different storage devices, the storage control apparatus comprising:
a processor that performs a procedure including:
monitoring errors in each of the storage devices and registering error information in an error score table in a memory to record past errors in the storage devices, within a settable time limit; and
determining, when use of the first storage device is stopped, whether to either generate in the spare storage device the data originally stored in the first storage device or detect removal of the first storage device from the storage system and subsequent mounting of a new storage device as a replacement therefor and then generate, in the new storage device instead of the spare storage device, the data originally stored in the first storage device, based on the error information indicating the past errors in other storage devices than the first storage device.

* * * * *